(12) United States Patent
Fleizach

(10) Patent No.: US 9,645,699 B2
(45) Date of Patent: May 9, 2017

(54) DEVICE, METHOD, AND GRAPHICAL USER INTERFACE FOR ADJUSTING PARTIALLY OFF-SCREEN WINDOWS

(75) Inventor: Christopher Brian Fleizach, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/436,473

(22) Filed: Mar. 30, 2012

(65) Prior Publication Data
US 2013/0212522 A1  Aug. 15, 2013

Related U.S. Application Data

(60) Provisional application No. 61/597,691, filed on Feb. 10, 2012.

(51) Int. Cl.
G06F 3/0481 (2013.01)
G06F 3/0488 (2013.01)
G06F 3/0484 (2013.01)

(52) U.S. Cl.
CPC .......... *G06F 3/0481* (2013.01); *G06F 3/0484* (2013.01); *G06F 3/0488* (2013.01); *G06F 3/04812* (2013.01)

(58) Field of Classification Search
CPC ............. G06F 3/04812; G06F 3/04845; G06F 3/0481; G06F 3/0485; G06F 3/04892; G09G 2340/04
See application file for complete search history.

(56) References Cited

U.S. PATENT DOCUMENTS

| | | |
|---|---|---|
| 5,305,435 A | 4/1994 | Bronson |
| 5,495,566 A * | 2/1996 | Kwatinetz ................... 715/785 |
| 6,654,036 B1 | 11/2003 | Jones |
| 2003/0179243 A1 | 9/2003 | Numano |
| 2003/0189594 A1 * | 10/2003 | Jones ............................ 345/764 |
| 2003/0231164 A1 * | 12/2003 | Blumer et al. ................ 345/159 |
| 2004/0261038 A1 | 12/2004 | Ording et al. |
| 2007/0152980 A1 * | 7/2007 | Kocienda et al. ............ 345/173 |
| 2008/0163101 A1 * | 7/2008 | Rimas-Ribikauskas et al. ............................ 715/781 |

(Continued)

OTHER PUBLICATIONS

International Preliminary Report on Patentability received for PCT Patent Application No. PCT/US2013/025148, mailed on Aug. 21, 2014, 11 pages.

(Continued)

*Primary Examiner* — Weilun Lo
*Assistant Examiner* — David S Posigian
(74) *Attorney, Agent, or Firm* — Morrison & Foerster LLP

(57) ABSTRACT

An electronic device with a display bounded by a plurality of edges: displays a first portion of a first window on the display while not displaying a remaining portion of the first window on the display, wherein: the remaining portion of the first window extends in a virtual sense beyond at least one edge of the display; detects a first input that positions a cursor at a location on the display, the location being: over the displayed first portion of the first window, and within a predefined distance of an edge of the display; in response to detecting the first input that positions the cursor at the location on the display, activates a window adjustment mode; while the window adjustment mode is active, detects a second input; and, in response to detecting the second input, adjusts the first window in accordance with the second input.

12 Claims, 28 Drawing Sheets

(56) References Cited

U.S. PATENT DOCUMENTS

| | | | |
|---|---|---|---|
| 2009/0164936 | A1 | 6/2009 | Kawaguchi |
| 2009/0178008 | A1 | 7/2009 | Herz et al. |
| 2009/0199128 | A1* | 8/2009 | Matthews et al. ............ 715/799 |
| 2010/0257482 | A1* | 10/2010 | Lyons et al. .................. 715/794 |
| 2010/0278504 | A1* | 11/2010 | Lyons et al. ..................... 386/52 |
| 2011/0074710 | A1* | 3/2011 | Weeldreyer et al. ......... 345/173 |
| 2011/0191712 | A1 | 8/2011 | Machida |
| 2011/0252309 | A1* | 10/2011 | Simmons et al. ............ 715/243 |
| 2012/0030569 | A1 | 2/2012 | Migos et al. |
| 2013/0176212 | A1* | 7/2013 | Nan et al. ..................... 345/157 |

OTHER PUBLICATIONS

Ant, "How to resize a window on your Mac's screen that's too big to drag," MacYourself, Apr. 16, 2009, http://www.macyourself.com/2009/04/16/how-to-resize-a-window-on-your-macs-screen-thats-too-big-to-drag/, 16 pages.

Brink, "How to Move a Offscreen Window Back to the Desktop in Vista," Windows Vista Forums, Jul. 26, 2007, http://www.vistax64.com/tutorials/80519-offscreen-window-bring-back-desktop.html, 6 pages.

Broida, R., Turn Off Automatic Window resizing and Docking in Windows 7, pcworld.com, Feb. 21, 2011, http://www.pcworld.com/article/220222/Windows.html, 2 pages.

How-To Geek, "Bring Misplaced Off-Screen Windows Back to Your Desktop (Keyboard Trick)," Mar. 15, 2007, howtogeek.com, http://www.howtogeek.com/howto/windows/bring-misplaced-off-screen-windows-back-to-your-desktop-keyboard-trick/, 1 page.

Irradiated Software, "Cinch: Window management at its simplest," Irradiated Software.com, © 2009-2013, http://www.ir-radiatedsoftware.com/cinch/, 2 pages.

MacUpdate, "Cinch," Dec. 22, 2009, https://www.macupdate.com/app/mac/33161/cinch, 5 pages.

OS X Daily, "How to Resize a Window That is Too Big or Off Screen in Mac OS," Jul. 5, 2010, http://osxdaily.com/2010/07/05/how-to-resize-a-window-that-is-too-big-or-off-screen-in-mac-os/, 4 pages.

Rawson, C., "Mac 101: OS X Lion's new window," TUAW, Jul. 24, 2011, http://www.tuaw.com/2011/07/24/mac-101-os-x-lions-new-window-resizing-features/, 3 pages.

Romej, S., "Resize off screen window that's too large on your Mac," romej.com, Jun. 17, 2009, http://romej.com/archives/648/resize-off-screen-window-thats-too-large-on-your-mac, 1 page.

Siracusa, J., "Mac OS X 10.7 Lion: the ARS Technica review," arstechnica.com, Jul. 20, 2011, http://arstechnica.com/apple/2011/07/mac-os-x-10-7/6/, 4 pages.

Watching the Net, "How to Move Windows That Are Off Screen Back on the Desktop in Windows," watchingthenet.com, Dec. 5, 2008, http://www.watchingthenet.com/how-to-move-windows-that-are-off-screen-back-on-the-desktop-in-windows.html, 4 pages.

Woo!woo!Mac, "How to Resize a Large Window When the Resize Corner is Off the Screen," woo!woo!mac.com, 2010, http://www.woowoomac.com/blog/how-to-resize-a-large-window-when-the-resize-corner-is-off-t.html, 3 pages.

International Search Report and Written Opinion dated Jun. 3, 2013, received in International Patent Application No. PCT/US2013/025148, which corresponds to U.S. Appl. No. 13/436,473, 14 pages (Fleizach).

* cited by examiner

DEVICE, METHOD, AND GRAPHICAL USER INTERFACE FOR ADJUSTING PARTIALLY OFF-SCREEN WINDOWS

RELATED APPLICATION

This application claims priority to U.S. Provisional Application Ser. No. 61/597,691, filed Feb. 10, 2012, which is incorporated herein by reference in its entirety.

TECHNICAL FIELD

This relates generally to electronic devices that display windows in a graphical user interface.

BACKGROUND

Manipulation of user interface objects on a display is common on computers and other electronic computing devices. Such manipulations may be performed using any of a variety of input devices, such as a touch-sensitive surface (e.g., touch pad, touch screen) or a mouse. Exemplary manipulations include adjusting (e.g., resizing and/or repositioning) one or more windows, including windows that are partially off-screen.

But existing methods for adjusting partially off-screen windows are cumbersome and inefficient. For example, a partially off-screen window typically must be moved completely back on-screen first in order to adjust its size. This is tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for adjusting partially off-screen windows. Such methods and interfaces may complement or replace conventional methods for adjusting partially off-screen windows. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display, the display bounded by a plurality of edges. The method includes: displaying a first portion of a first window on the display while not displaying a remaining portion of the first window on the display, wherein: the remaining portion of the first window extends in a virtual sense beyond at least one edge of the display, the displayed first portion of the first window has a first displayed size, and the first window has a total size that is a sum of the first displayed size and an undisplayed size of the remaining portion of the first window; detecting a first input that positions a cursor at a location on the display, the location being: over the displayed first portion of the first window, and within a predefined distance of an edge of the display; in response to detecting the first input that positions the cursor at the location on the display, activating a window adjustment mode; while the window adjustment mode is active, detecting a second input; and, in response to detecting the second input, adjusting the first window in accordance with the second input.

In accordance with some embodiments, an electronic device includes a display, the display bounded by a plurality of edges, one or more processors, memory, and one or more programs. The one or more programs are stored in the memory and configured to be executed by the one or more processors. The one or more programs include instructions for: displaying a first portion of a first window on the display while not displaying a remaining portion of the first window on the display, wherein: the remaining portion of the first window extends in a virtual sense beyond at least one edge of the display, the displayed first portion of the first window has a first displayed size, and the first window has a total size that is a sum of the first displayed size and an undisplayed size of the remaining portion of the first window; detecting a first input that positions a cursor at a location on the display, the location being: over the displayed first portion of the first window, and within a predefined distance of an edge of the display; in response to detecting the first input that positions the cursor at the location on the display, activating a window adjustment mode; while the window adjustment mode is active, detecting a second input; and, in response to detecting the second input, adjusting the first window in accordance with the second input.

In accordance with some embodiments, a computer readable storage medium has stored therein instructions which when executed by an electronic device with a display, the display bounded by a plurality of edges, cause the device to: display a first portion of a first window on the display while not displaying a remaining portion of the first window on the display, wherein: the remaining portion of the first window extends in a virtual sense beyond at least one edge of the display, the displayed first portion of the first window has a first displayed size, and the first window has a total size that is a sum of the first displayed size and an undisplayed size of the remaining portion of the first window; detect a first input that positions a cursor at a location on the display, the location being: over the displayed first portion of the first window, and within a predefined distance of an edge of the display; in response to detecting the first input that positions the cursor at the location on the display, activate a window adjustment mode; while the window adjustment mode is active, detect a second input; and, in response to detecting the second input, adjust the first window in accordance with the second input.

In accordance with some embodiments, a graphical user interface on an electronic device with a display, the display bounded by a plurality of edges, a memory, and one or more processors to execute one or more programs stored in the memory includes a first window, including a first portion of the first window displayed on the display while not displaying a remaining portion of the first window on the display, wherein: the remaining portion of the first window extends in a virtual sense beyond at least one edge of the display, the displayed first portion of the first window has a first displayed size, and the first window has a total size that is a sum of the first displayed size and an undisplayed size of the remaining portion of the first window; and a cursor. In response to detection of a first input that positions the cursor at a location on the display, the location being over the displayed first portion of the first window and within a predefined distance of an edge of the display, a window adjustment mode is activated. In response to detection of a second input while the window adjustment mode is active, the first window is adjusted in accordance with the second input.

In accordance with some embodiments, an electronic device includes: a display, the display bounded by a plurality of edges; means for displaying a first portion of a first window on the display while not displaying a remaining portion of the first window on the display, wherein: the remaining portion of the first window extends in a virtual sense beyond at least one edge of the display, the displayed first portion of the first window has a first displayed size, and the first window has a total size that is a sum of the first displayed size and an undisplayed size of the remaining portion of the first window; means for detecting a first input that positions a cursor at a location on the display, the location being: over the displayed first portion of the first window, and within a predefined distance of an edge of the display; means, responsive to detecting the first input that positions the cursor at the location on the display, for activating a window adjustment mode; means, enabled while the window adjustment mode is active, for detecting a second input; and, means, responsive to detecting the second input, for adjusting the first window in accordance with the second input.

In accordance with some embodiments, an information processing apparatus for use in an electronic device with a display, the display bounded by a plurality of edges, includes: means for displaying a first portion of a first window on the display while not displaying a remaining portion of the first window on the display, wherein: the remaining portion of the first window extends in a virtual sense beyond at least one edge of the display, the displayed first portion of the first window has a first displayed size, and the first window has a total size that is a sum of the first displayed size and an undisplayed size of the remaining portion of the first window; means for detecting a first input that positions a cursor at a location on the display, the location being: over the displayed first portion of the first window, and within a predefined distance of an edge of the display; means, responsive to detecting the first input that positions the cursor at the location on the display, for activating a window adjustment mode; means, enabled while the window adjustment mode is active, for detecting a second input; and, means, responsive to detecting the second input, for adjusting the first window in accordance with the second input.

In accordance with some embodiments, an electronic device includes a display unit. The display unit is bounded by a plurality of edges. The display unit is configured to display a first portion of a first window on the display unit while not displaying a remaining portion of the first window on the display unit, where: the remaining portion of the first window extends in a virtual sense beyond at least one edge of the display unit, the displayed first portion of the first window has a first displayed size, and the first window has a total size that is a sum of the first displayed size and an undisplayed size of the remaining portion of the first window. Electronic device also includes a processing unit coupled to the display unit. The processing unit is configured to: detect a first input that positions a cursor at a location on the display unit, the location being: over the displayed first portion of the first window, and within a predefined distance of an edge of the display unit; in response to detecting the first input that positions the cursor at the location on the display unit, activate a window adjustment mode; while the window adjustment mode is active, detecting a second input; and, in response to detecting the second input, adjust the first window in accordance with the second input.

Thus, electronic devices with displays are provided with faster, more efficient methods and interfaces for adjusting partially off-screen windows, thereby increasing the effectiveness, efficiency, and user satisfaction with such devices. Such methods and interfaces may complement or replace conventional methods for adjusting partially off-screen windows.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Many electronic devices have graphical user interfaces that display windows corresponding to applications and folders. A window may extend off-screen beyond an edge of the display on which the window is displayed, thus a portion of the window is actually not displayed. When a user wants to adjust (e.g., to resize) the partially off-screen window, existing methods may make the user first move the window entirely within the edges of the display and then adjust the window. In the embodiments below, an improved method for adjusting partially off-screen windows is described. The method includes moving a cursor to a position that is over the displayed portion of the partially off-screen window and within a predefined distance from an edge of the display (e.g., the edge beyond which the window extends). In response, a window adjustment mode is activated. While the window adjustment mode is active, an input to adjust the window is detected. In response to the window adjustment input, the window is adjusted. This method streamlines the window adjustment process by eliminating the need to first move the window to a position entirely within the edges of the display.

Figure 5A:
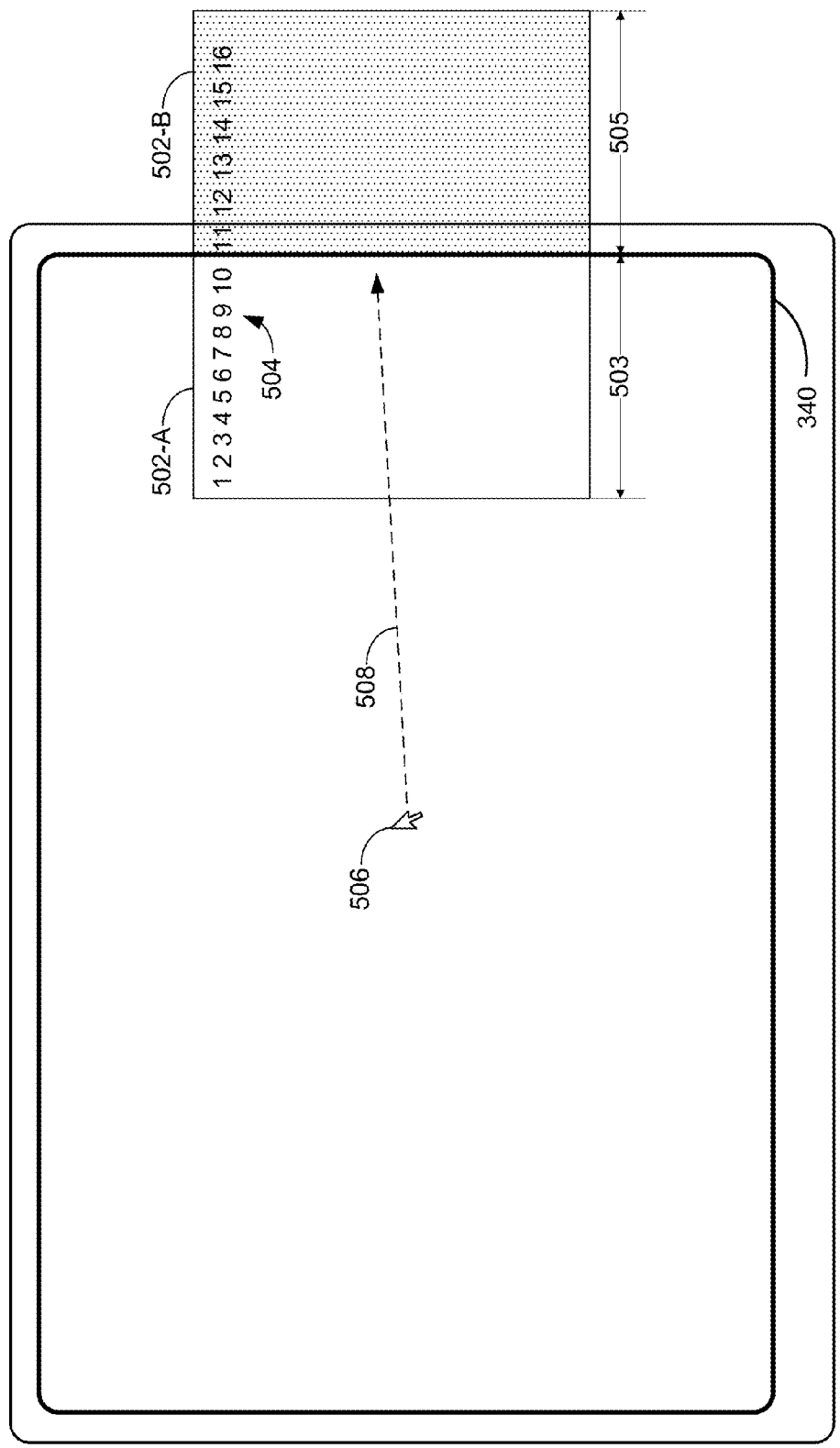
FIGS. 5A-5S illustrate exemplary user interfaces for adjusting partially off-screen windows in accordance with some embodiments.
Figure 5S:
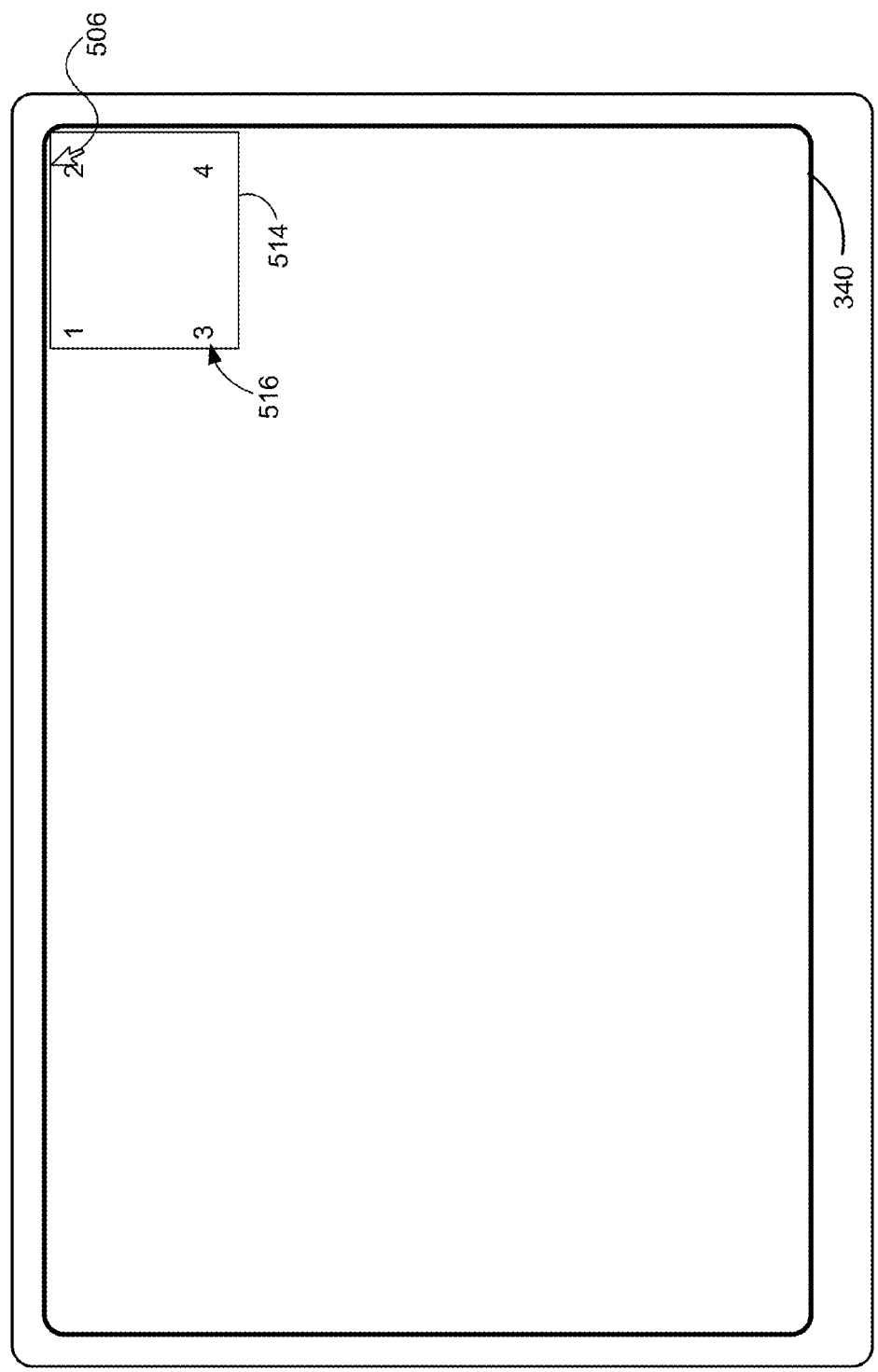
Figure 6A:
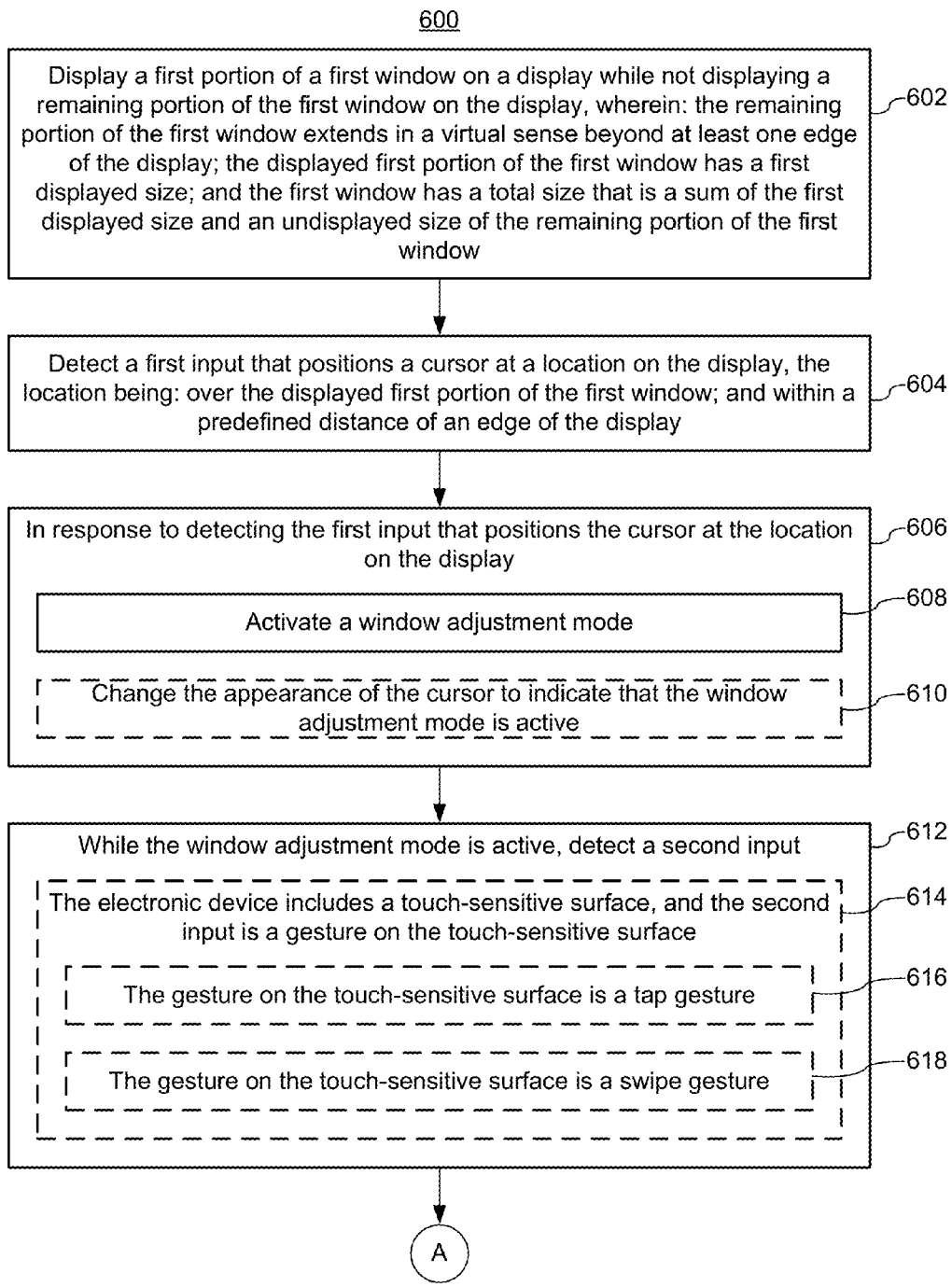
FIGS. 6A-6B are flow diagrams illustrating a method of adjusting partially off-screen windows in accordance with some embodiments.
Figure 6B:
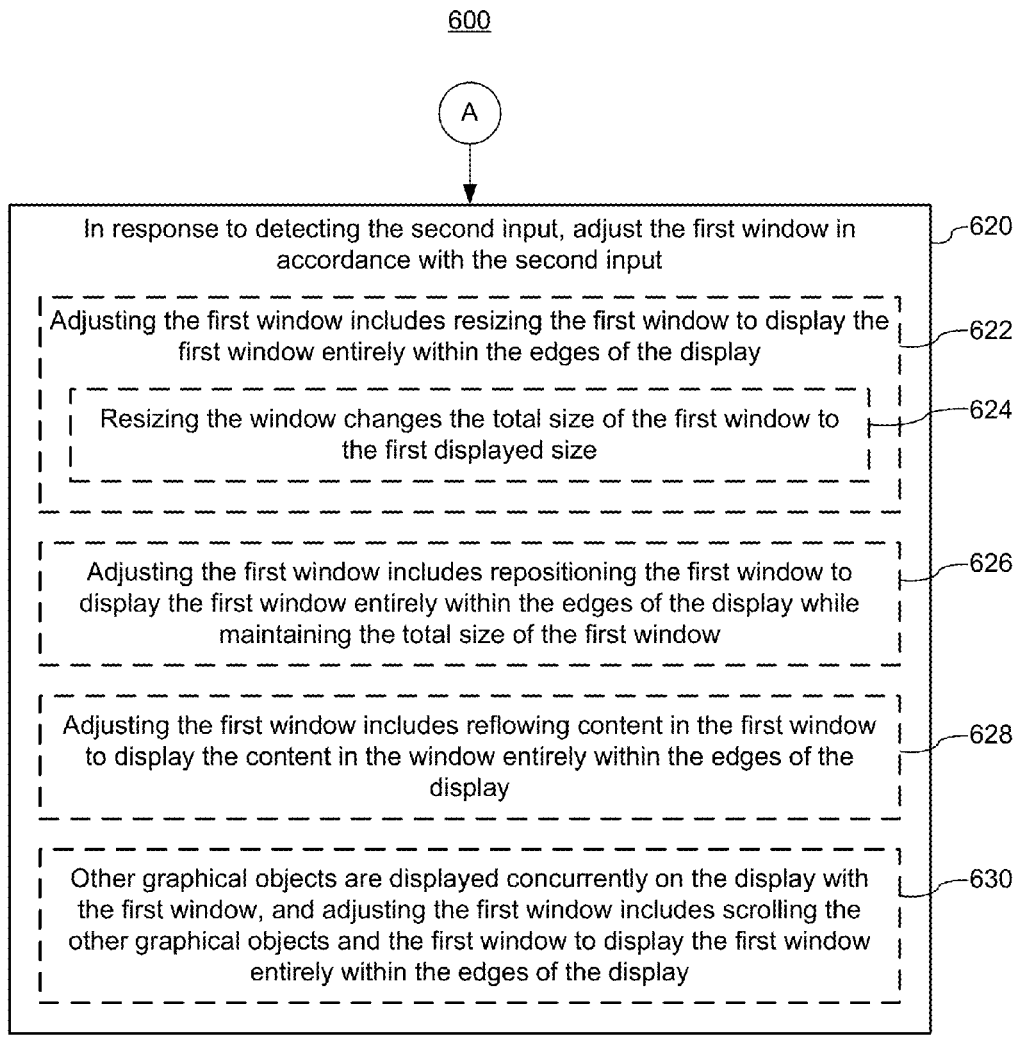

Below, FIGS. 1A-1B, 2, 3, and 7 provide a description of exemplary devices. FIGS. 4A-4B and 5A-5S illustrate exemplary user interfaces for adjusting partially off-screen windows. FIGS. 6A-6B are flow diagrams illustrating a method of adjusting partially off-screen windows. The user interfaces in FIGS. 5A-5S are used to illustrate the processes in FIGS. 6A-6B.

EXEMPLARY DEVICES

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
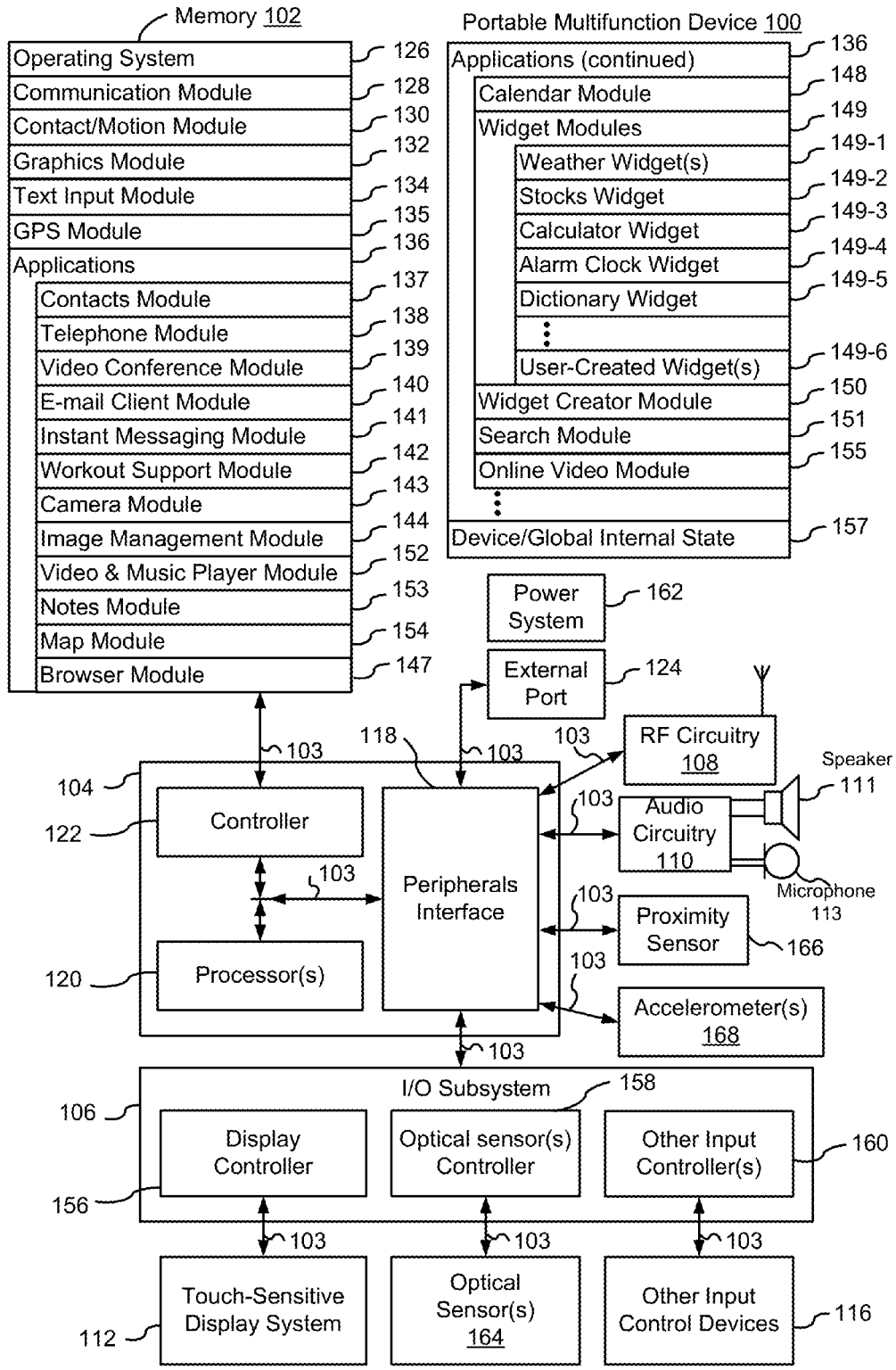
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for video-conferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
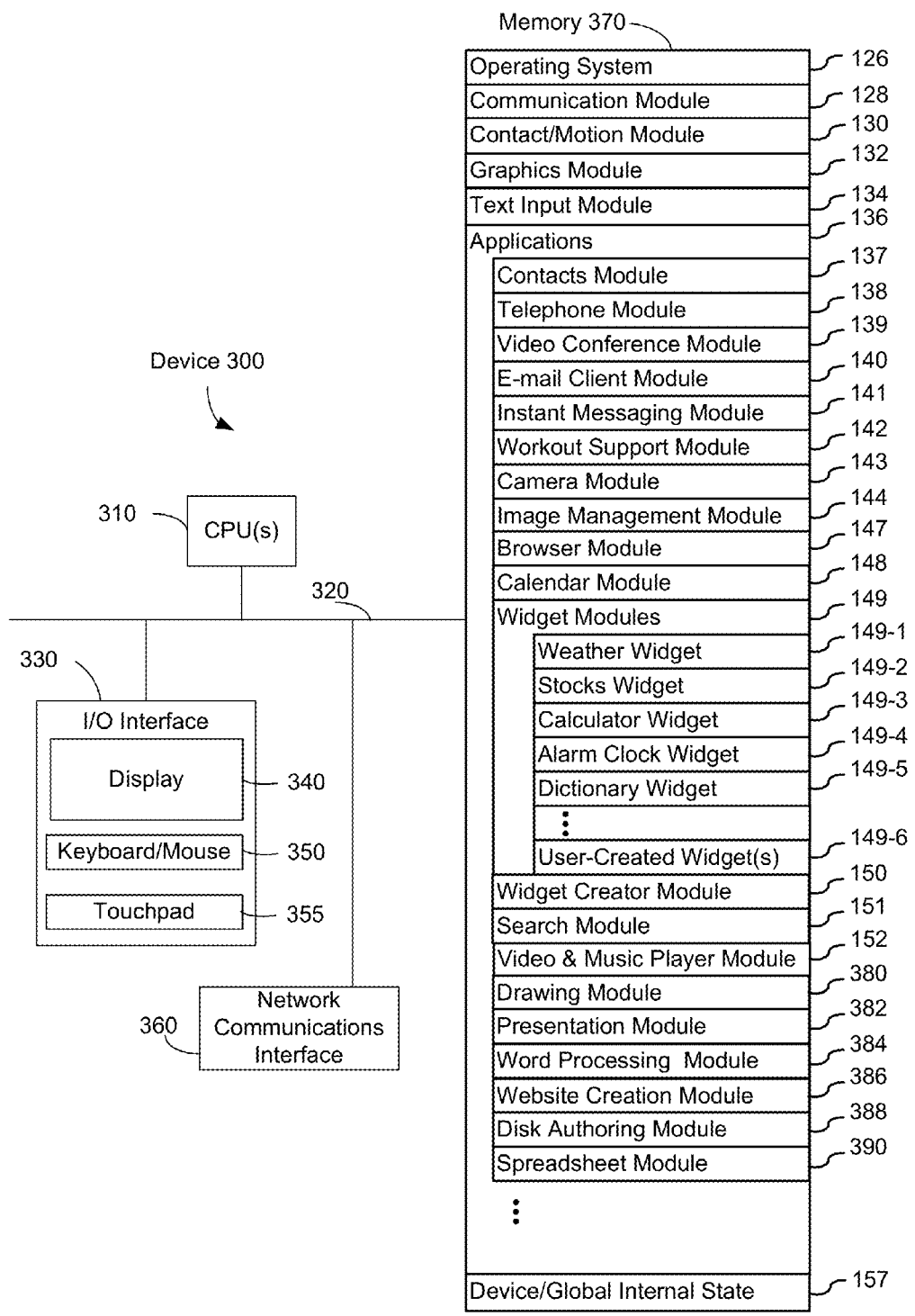
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
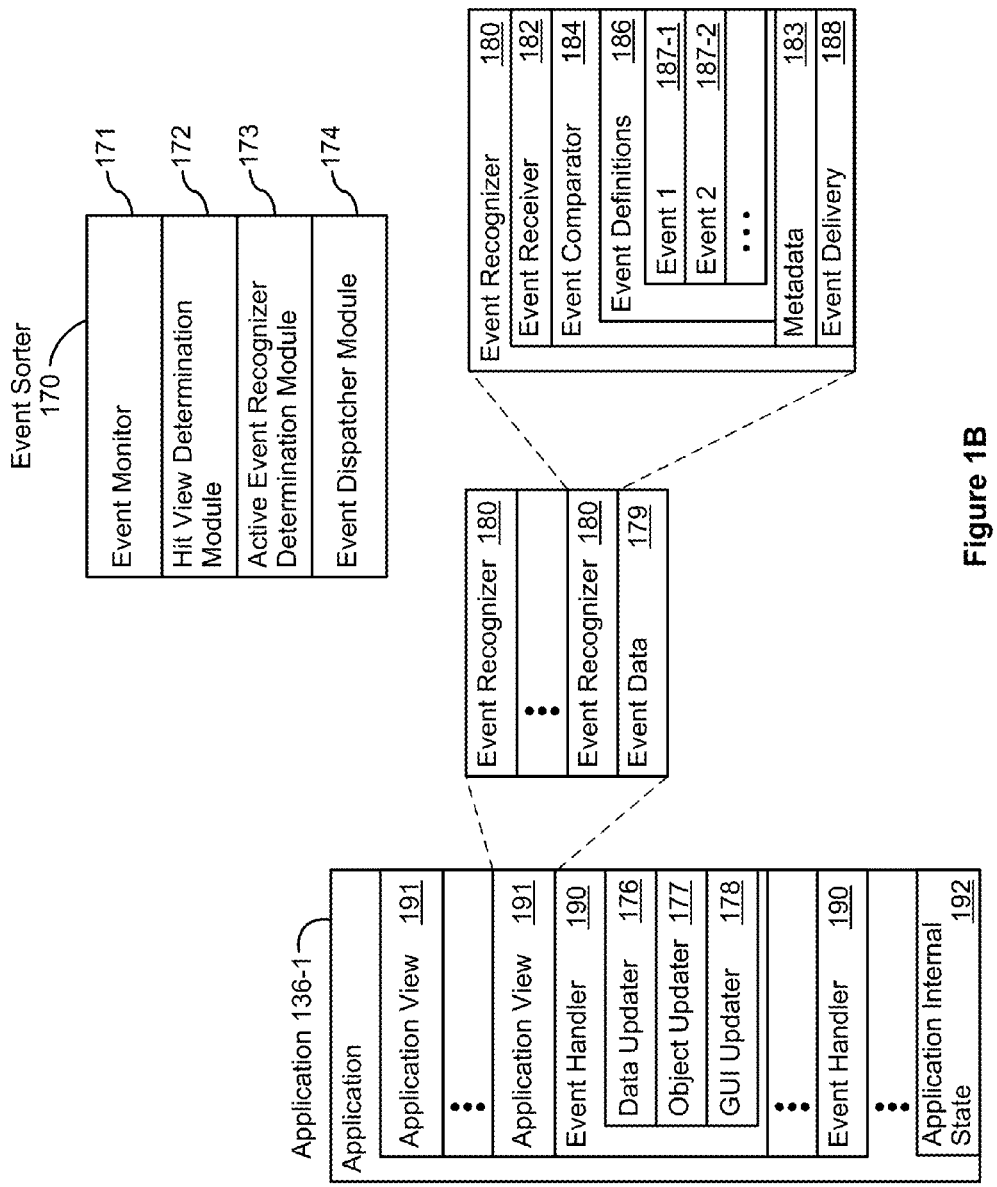
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
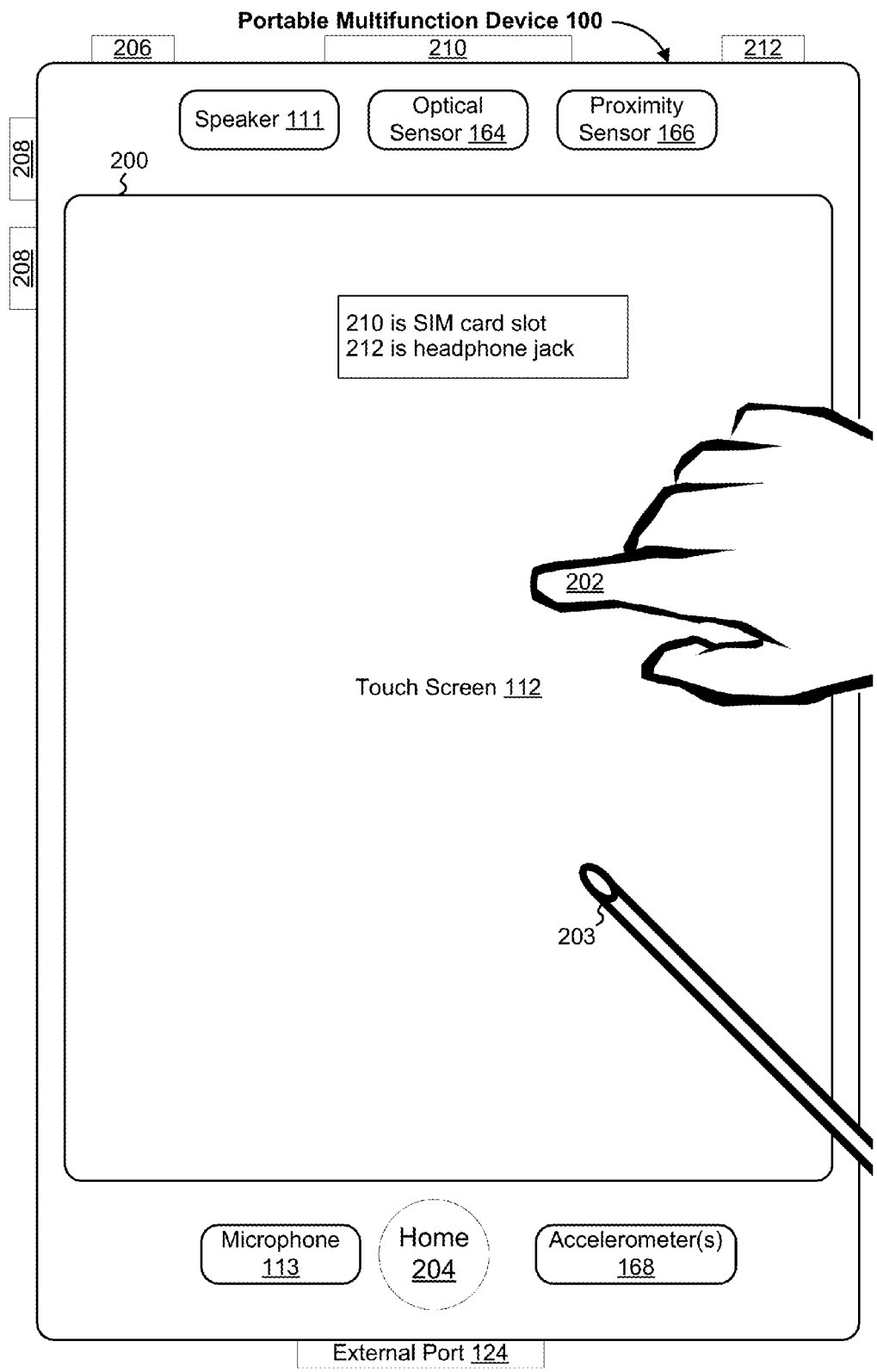
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which may be a touch screen display. Display 340 does not have to be a touch screen display (e.g., when a mouse or touchpad are used for input). I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
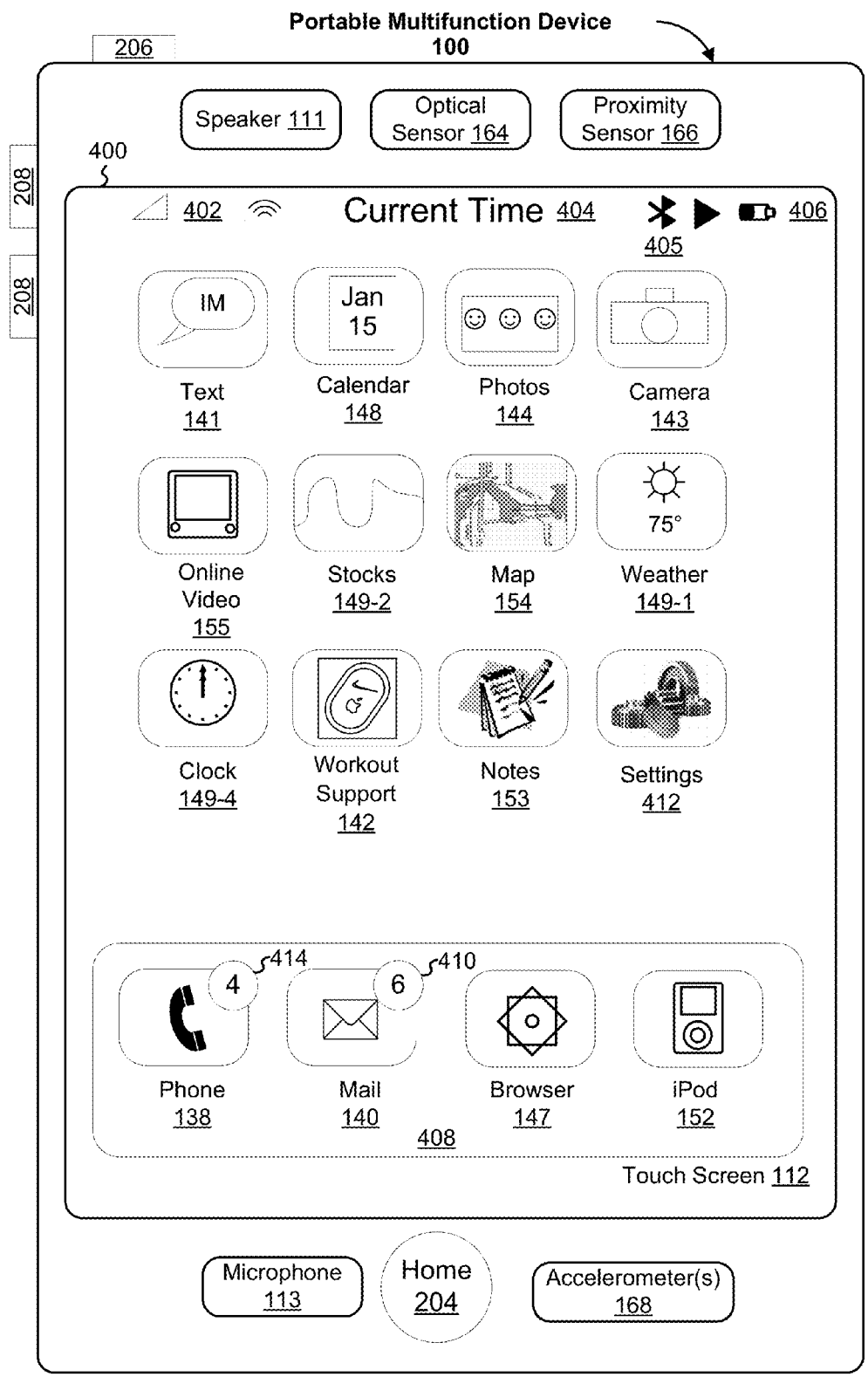
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
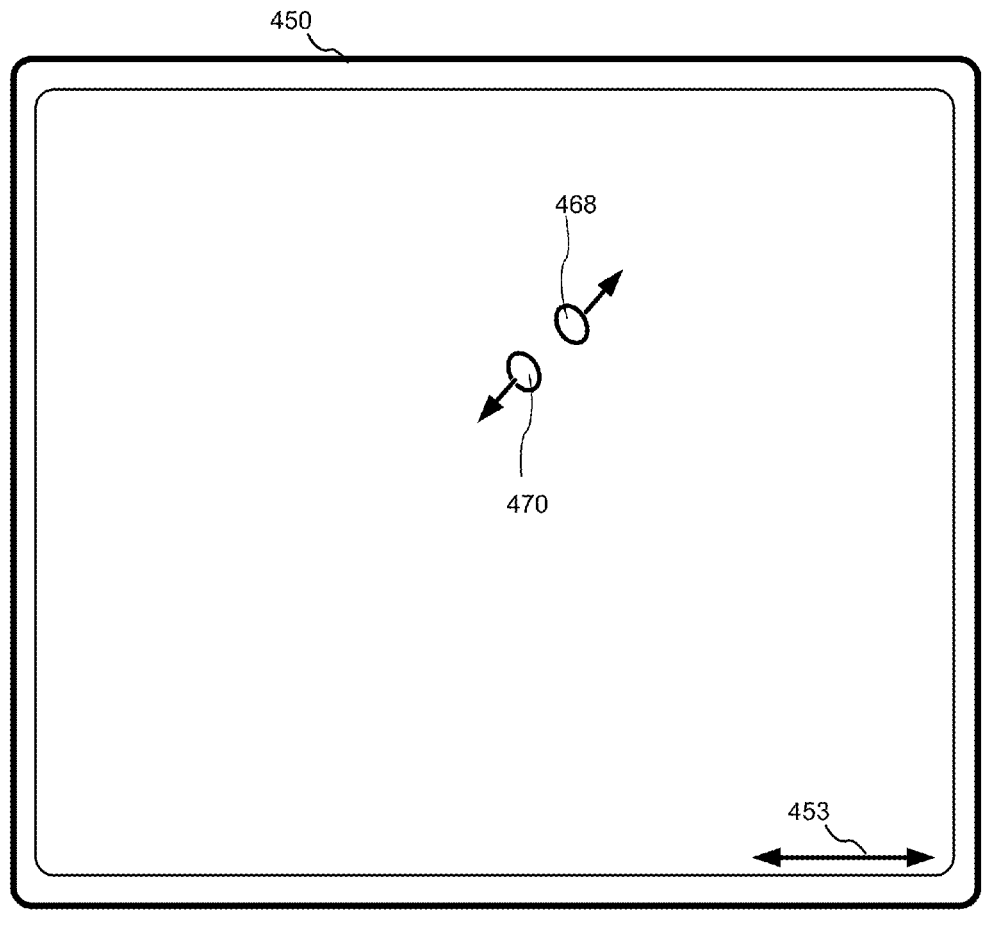
FIG. 4B illustrates an exemplary user interface for a multifunction device with a touch-sensitive surface that is separate from the display in accordance with some embodiments.
Figure 4B:
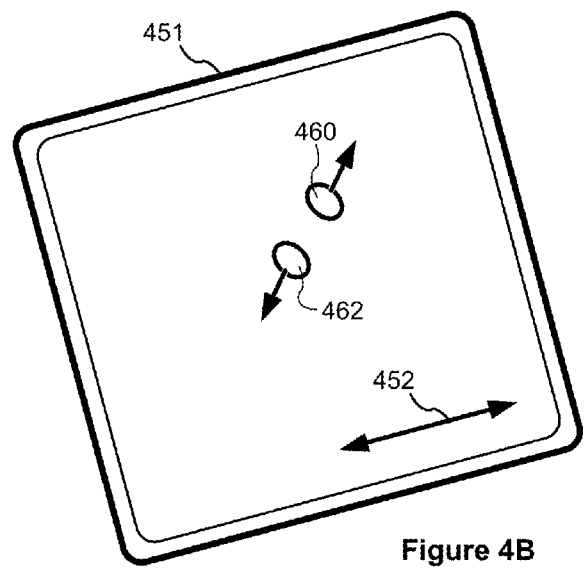

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although inputs may be detected on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450).

In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

It should be understood that, in some embodiments, one or more of the finger inputs are replaced with input from another input device (e.g., a mouse based input or stylus input), or vice versa. For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact).

USER INTERFACES AND ASSOCIATED PROCESSES

Attention is now directed towards embodiments of user interfaces ("UI") and associated processes that may be implemented on an electronic device with a display and, optionally, a touch-sensitive surface, such as device 300 or portable multifunction device 100.

FIGS. 5A-5S illustrate exemplary user interfaces for adjusting partially off-screen windows in accordance with some embodiments. The user interfaces in these figures are used to illustrate the processes described below, including the processes in FIGS. 6A-6B.

FIG. 5A illustrates window 502 of an application. Portion 502-A of window 502 is within the edges of, and displayed on, a display of an electronic device (e.g., display 340 of device 300). Portion 502-B of window 502 extends off-screen (indicated by the dotted background), beyond the right edge of display 340, and is not displayed on display 340. Portion 502-A has width 503 and portion 502-B has width 505.

In FIG. 5A, the total size of window 502 includes the size of portion 502-A and the size of portion 502-B. The total width of window 502 in FIG. 5A is the sum of widths 503 and 505.

Window 502 includes content 504. In this example, for ease of illustration, content 504 includes the numerals 1 thru 16 in text. In practice, content 504 would typically include more complex graphics. In FIG. 5A, a portion of content 504 (numbers 1 thru 10) is in portion 502-A and is displayed on display 340. The other portion of content 504 (numbers 11 thru 16) is in portion 502-B and is off-screen.

Figure 5B:
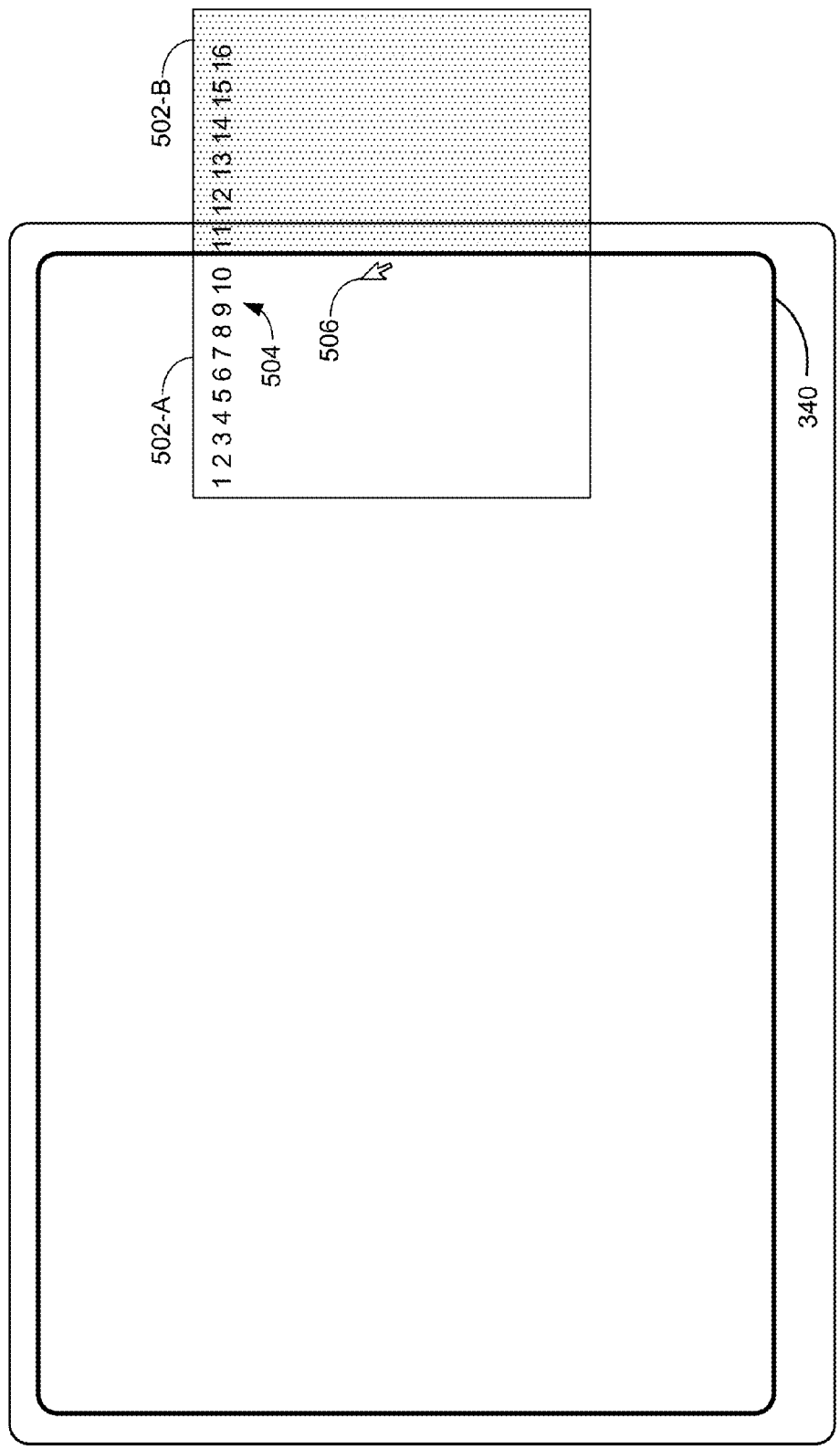
Figure 5C:
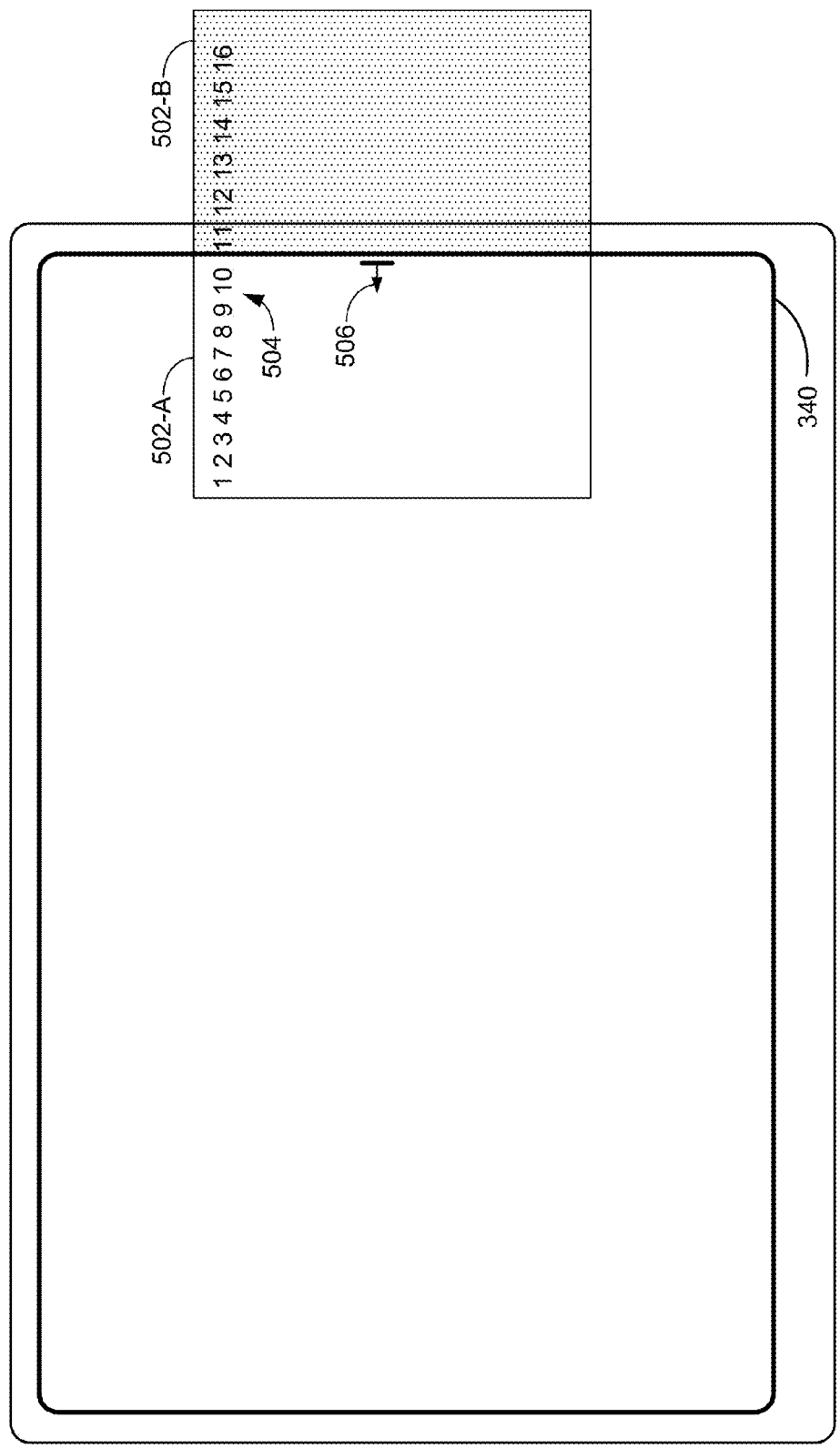

Cursor 506 is also displayed on display 340. In some embodiments, cursor 506 is a mouse cursor or pointer. In FIG. 5A, cursor 506 is displayed at a location on display 340 that is away from window 502. Cursor 506 may be moved to a different location on display 340 in response to the detection of a cursor movement input (e.g., a mouse input, or a gesture on a touch-sensitive surface). For example, in FIG. 5A, cursor 506 is shown as moving 508 toward the right edge of display 340, to a position over portion 502-A, in response to the detection of a cursor movement input (not shown) (e.g., a movement of mouse 350; or a gesture on a touch-sensitive surface, such as touchpad 355). FIG. 5B shows cursor 506, after movement 508, positioned at a location over portion 502-A and in proximity of the right edge of display 340.

In response to the detection of the cursor movement input that positions cursor 506 over portion 502-A and within a predefined distance (e.g., a predefined number of pixels) from the edge of display 340 beyond which portion 502-B extends, a window adjustment mode is activated. In some embodiments, the predefined distance is 3, 5, 10, or any suitable number of pixels for the pixel density of the display. In FIG. 5B, cursor 506 is over portion 502-A that is displayed in display 340 and is within the predefined distance from the right edge of display 340. Thus, the window adjustment mode is activated in response.

In some embodiments, in response to the detection of the cursor movement input that positions cursor 506 over portion 502-A and within a predefined distance from the edge of display 340 beyond which portion 502-B extends, cursor 506 is displayed with a different appearance to indicate activation of the window adjustment mode. For example, in FIG. 5C, the appearance of cursor 506 has changed from the pointer appearance as shown in FIG. 5B to the appearance shown in FIG. 5C. In some embodiments, the appearance that cursor 506 takes on while the window adjustment mode is active may give a visual hint of window adjustment operations that may be applied to window 502 in response to predefined inputs while the window adjustment mode is active.

While the window adjustment mode is active, a window adjustment input (not shown) is detected. In some embodiments, the window adjustment input corresponds to a predefined input. In some embodiments, the window adjustment input is a mouse button click or a gesture on a touch-sensitive surface. The gesture may be, for example, a swipe gesture or a tap gesture. In response to detection of the window adjustment input, window 502 is adjusted.

Figure 5D:
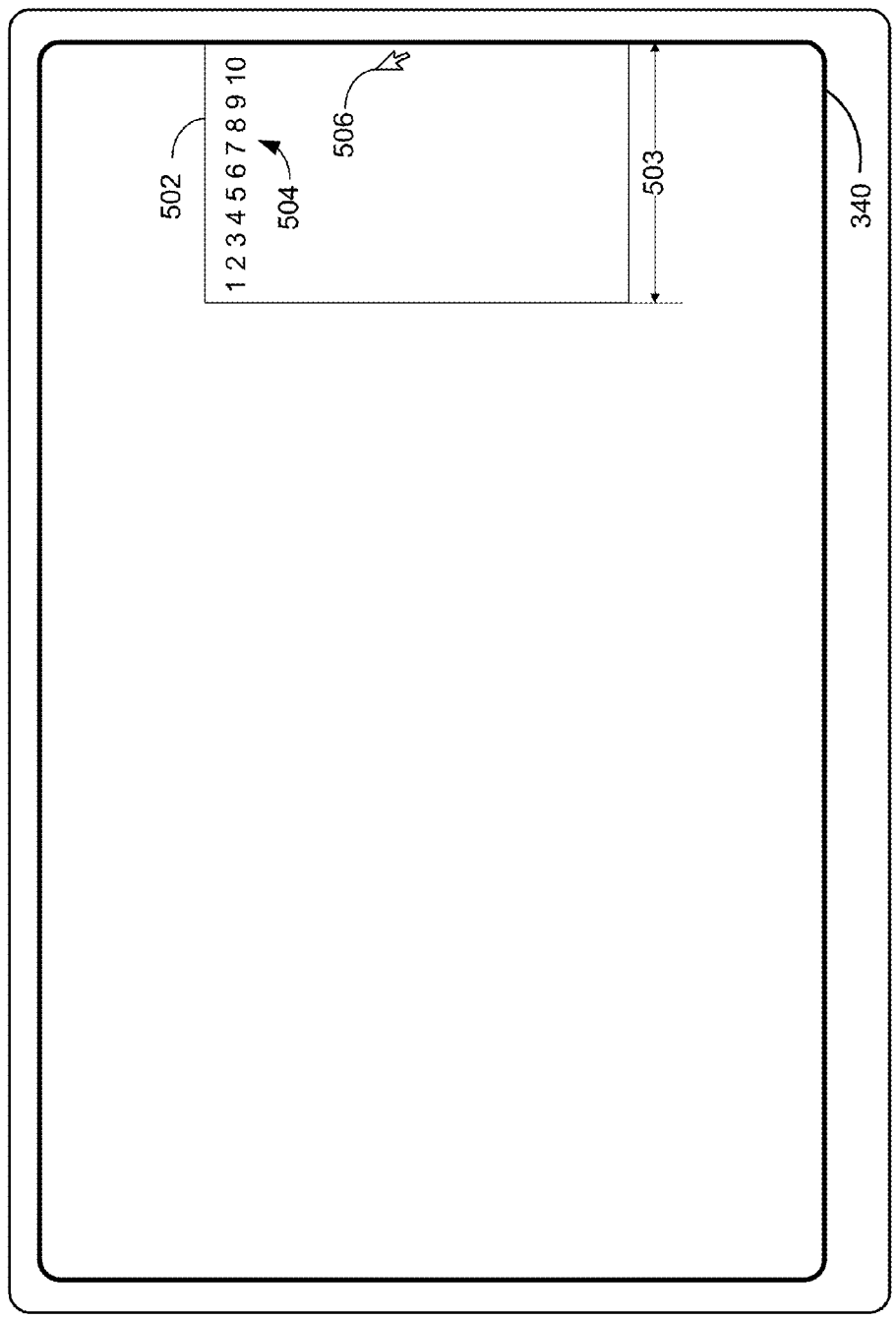

In some embodiments, the adjustment(s) to window 502 in response to detection of the window adjustment input includes resizing window 502 so that window 502 is displayed entirely within the edges of display 340. For example, in FIG. 5D, in response to detecting the window adjustment input while the window adjustment mode is active, window 502 is reduced in size to the size of portion 502-A. The width of window 502 is adjusted to width 503, as shown in FIG. 5D. After the resizing of window 502, numbers 11-16 in content 504 extend beyond the right edge of window 502 and is hidden (i.e., not displayed on display 340). To reveal numbers 11-16 in window 502, the user would have to scroll content 504 in window 502. In other words, window 502 is adjusted to the size of portion 502-A (or slightly smaller), with the portion of content 504 that is in portion 502-A displayed on display 340. In some embodiments, a tap gesture or mouse button click is associated with a window resizing operation such as the one shown in FIG. 5D. Thus, when the window adjustment input is a tap gesture or mouse button click, window 502 is adjusted in accordance with the operation associated with the gesture, such as the window resizing shown in FIG. 5D.

In some embodiments, "entirely within the edge(s)" of the display includes the edge(s) of the window being coincident with the edge(s) of the display but not extending beyond the edge(s) of the display. For example, in FIG. 5D, if the right edge of window 502 is coincident with the right edge of display 340, then window 502 is entirely within the edges of display 340.

Figure 5E:
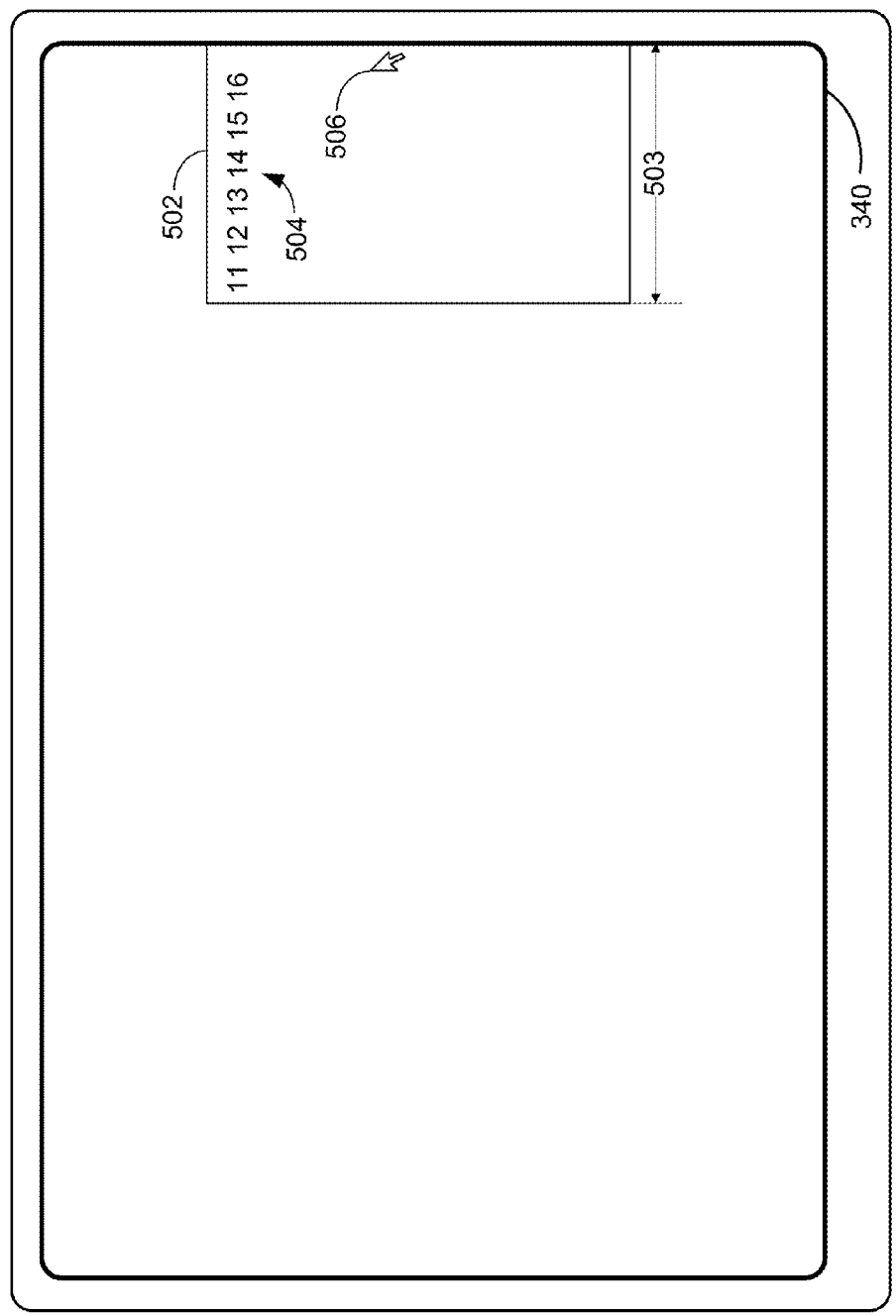

FIG. 5E shows an alternative adjustment to window 502 than that shown in FIG. 5D. In FIG. 5E, in response to detection of the window adjustment input while the window adjustment mode is active, window 502 is resized to width 503 (the width of portion 502-A), within the edges of display 340, so that window 502 is located entirely within the edges of display 340, and content 504 within window 502 may be shifted. After the shifting, numbers 1-10 in content 504 extend beyond the left edge of adjusted window 502 and are hidden. To reveal numbers 1-10 in window 502, the user would have to scroll content 504 in window 502. In other words, window 502 is adjusted to have the size of portion 502-A (or slightly smaller) and to have a portion of content 504 that was previously off-screen in window portion 502-B (FIG. 5C) displayed on display 340.

Figure 5F:
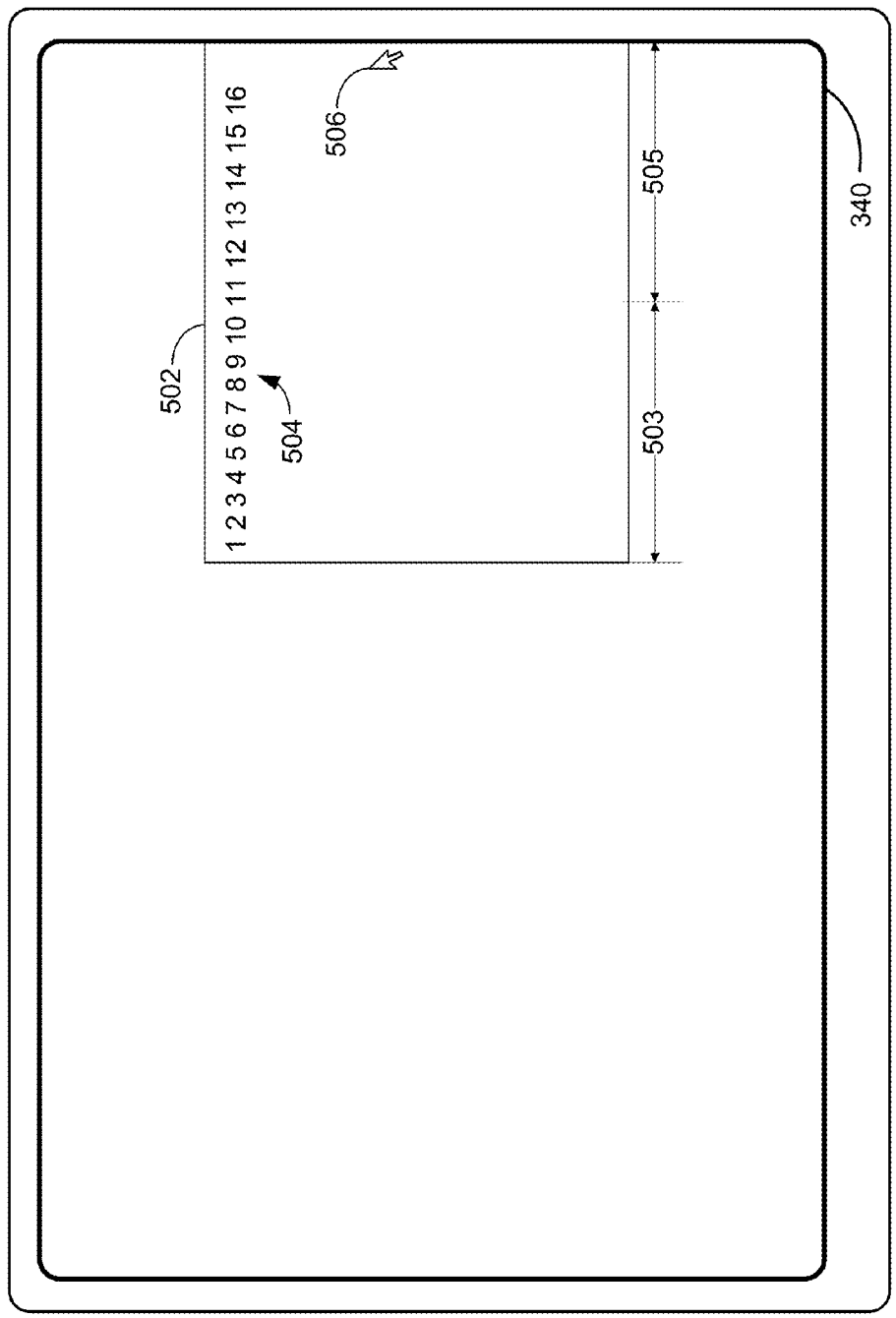

FIG. 5F shows yet another alternative adjustment to window 502 than that shown in FIGS. 5D-5E. In FIG. 5F, in response to detection of the window adjustment input while the window adjustment mode is active, window 502 is moved to a position where window 502 is entirely within the edges of display 340, but the size of window 502 remains the same as before the window adjustment mode is activated. The entirety of content 504 (e.g., numbers 1-16) is displayed on display 340, in window 502; numbers 11-16 in content 504, which were previously not displayed on display 340 because they were in portion 502-B, are displayed on display 340. In some embodiments, a swipe gesture is associated with a window moving operation such as the one shown in FIG. 5F. Thus, when the window adjustment input is a swipe gesture, window 502 is adjusted in accordance with the operation associated with the gesture, such as the one shown in FIG. 5F.

Figure 5G:
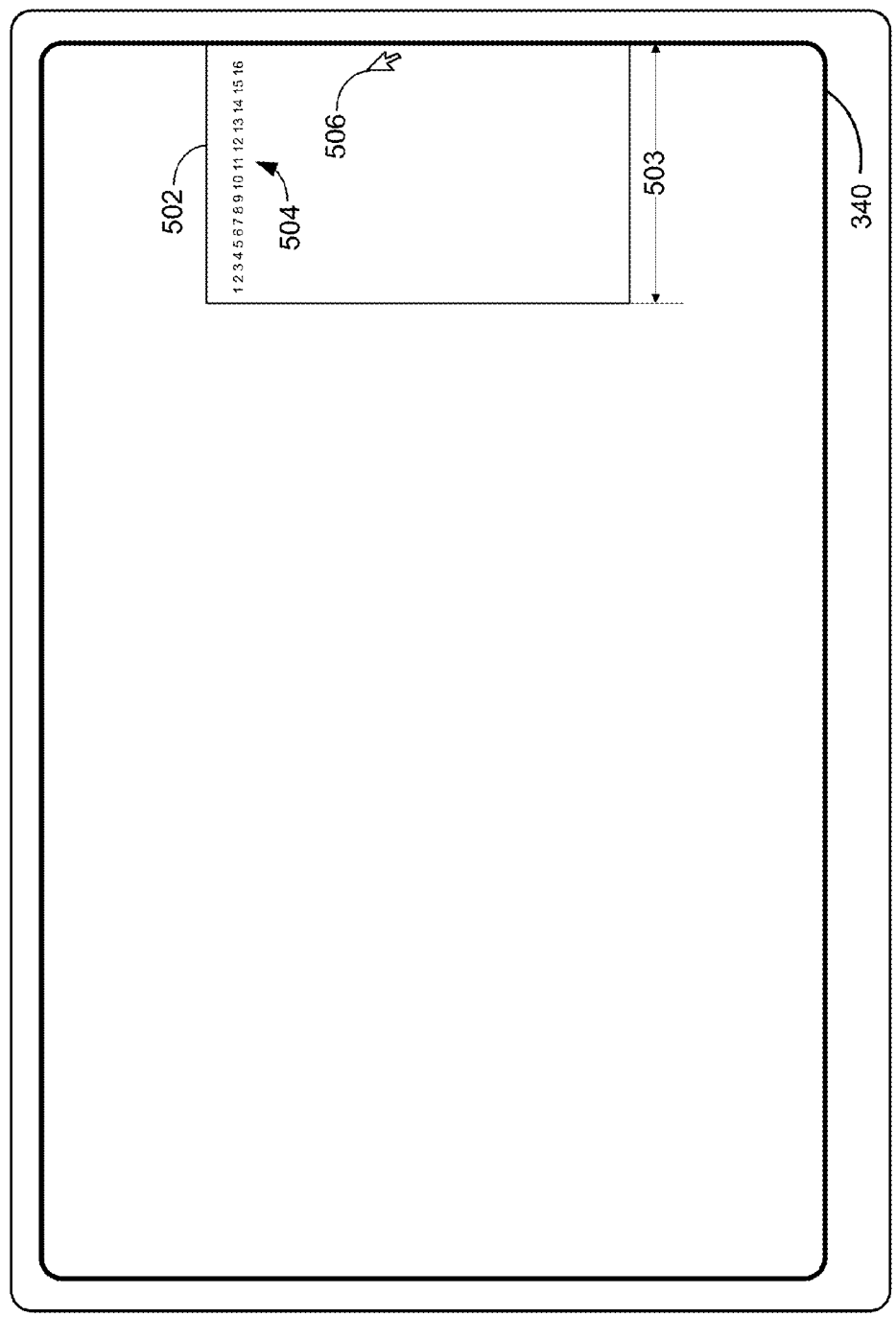

FIG. 5G shows yet another alternative adjustment to window 502 than that shown in FIGS. 5D-5F. In FIG. 5G, in response to detection of the window adjustment input while the window adjustment mode is active, the width of window 502 is adjusted to width 503 and content 504 is zoomed out. The entirety of content 504 is displayed, on display 340, in adjusted window 502 at a reduced scale.

Thus, a window may be adjusted to be entirely within the edges of display, so that none of the window extends beyond the edges of the display, and to have at least a portion of the content in the window displayed entirely within the edges of the display. In some embodiments, the adjustments that may be applied to a window includes one or more of: resizing the window, moving the window, adjusting the content within the window (e.g., scrolling, reflowing, shifting, realigning, rearranging, word-wrapping, removing whitespace, etc.), and rescaling (e.g., zooming in or out) the content.

It should be appreciated that while the example adjustments and the end results described above include particular adjustments or combinations of adjustments, the same end results may be achieved by different adjustments and/or combinations of adjustments.

Figure 5H:
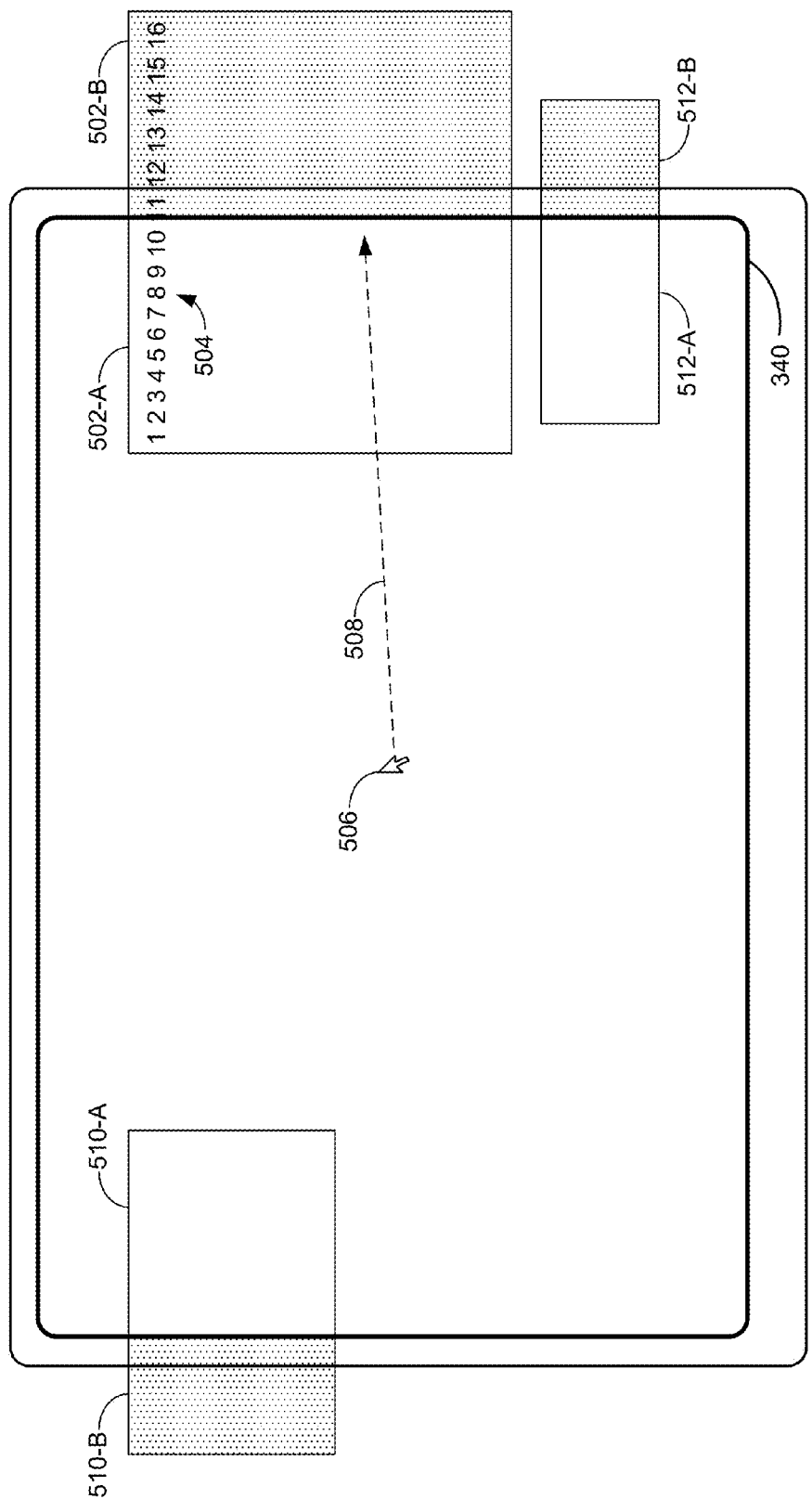

FIG. 5H illustrates window 502 and content 504, again with portion 502-A displayed on display 340 and portion 502-B extending beyond the right edge of display 340 (and thus not displayed on display 340). A part of content 504 (e.g., numbers 1-10) is located in portion 502-A and is displayed on display 340. The other part of content 504 (e.g., numbers 11-16) is in portion 502-B and is off-screen (not displayed on display 340). FIG. 5H also includes application windows 510 and 512. Windows 510 and 512 may be windows for the same application as window 502. Alternatively, windows 510 and 512 may be windows for different applications from the application to which window 502 corresponds. Window 510 includes portion 510-A that is within the edges of display 340 and displayed on display 340, and portion 510-B that extends beyond the left edge of display 340 (indicated by the dotted background) and not displayed on display 340. Window 512 includes portion 512-A that is within the edges of display 340 and displayed on display 340, and portion 512-B that extends beyond the right edge of display 340 (indicated by the dotted background) and not displayed on display 340.

Figure 5I:
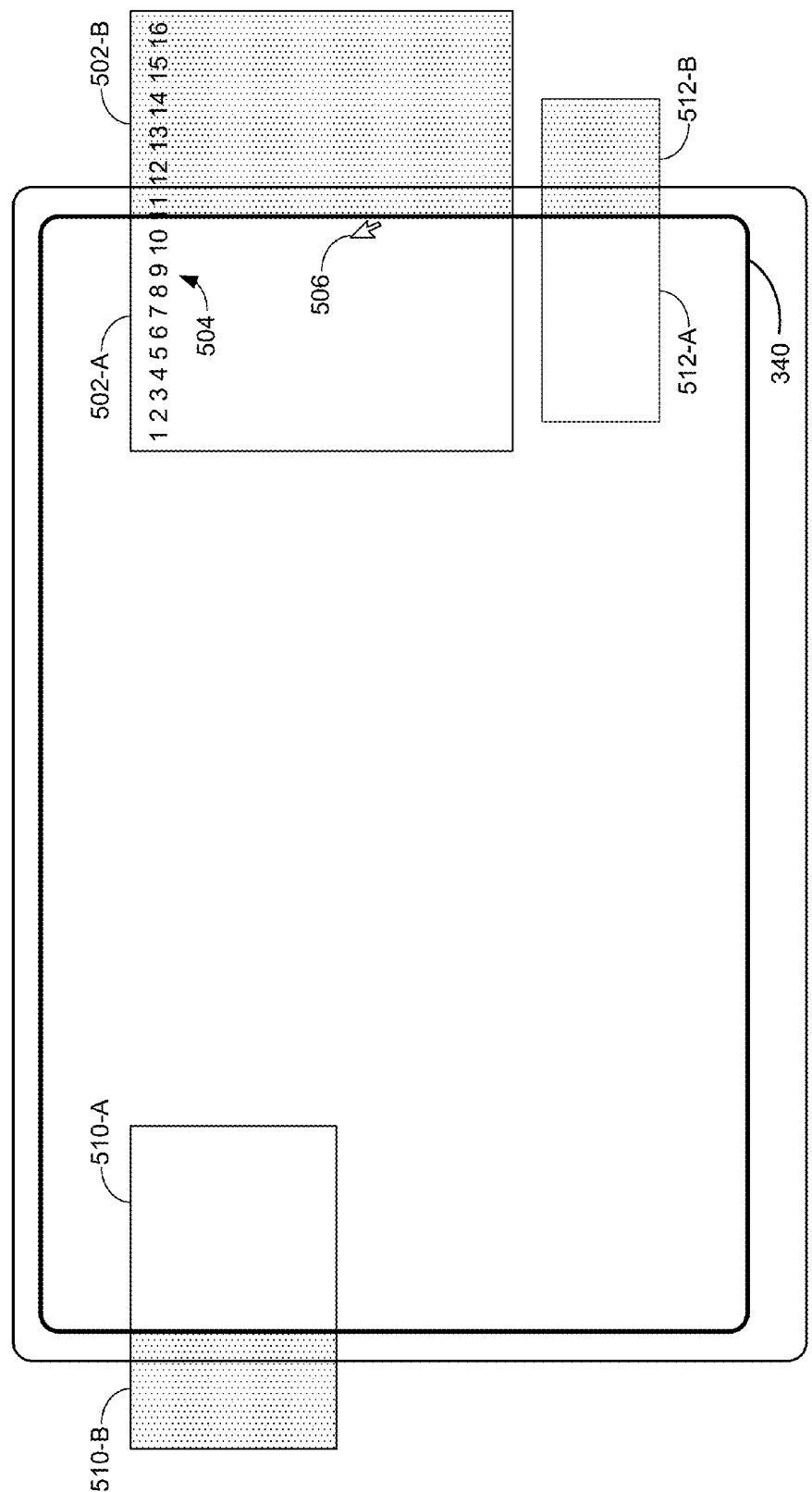
Figure 5J:
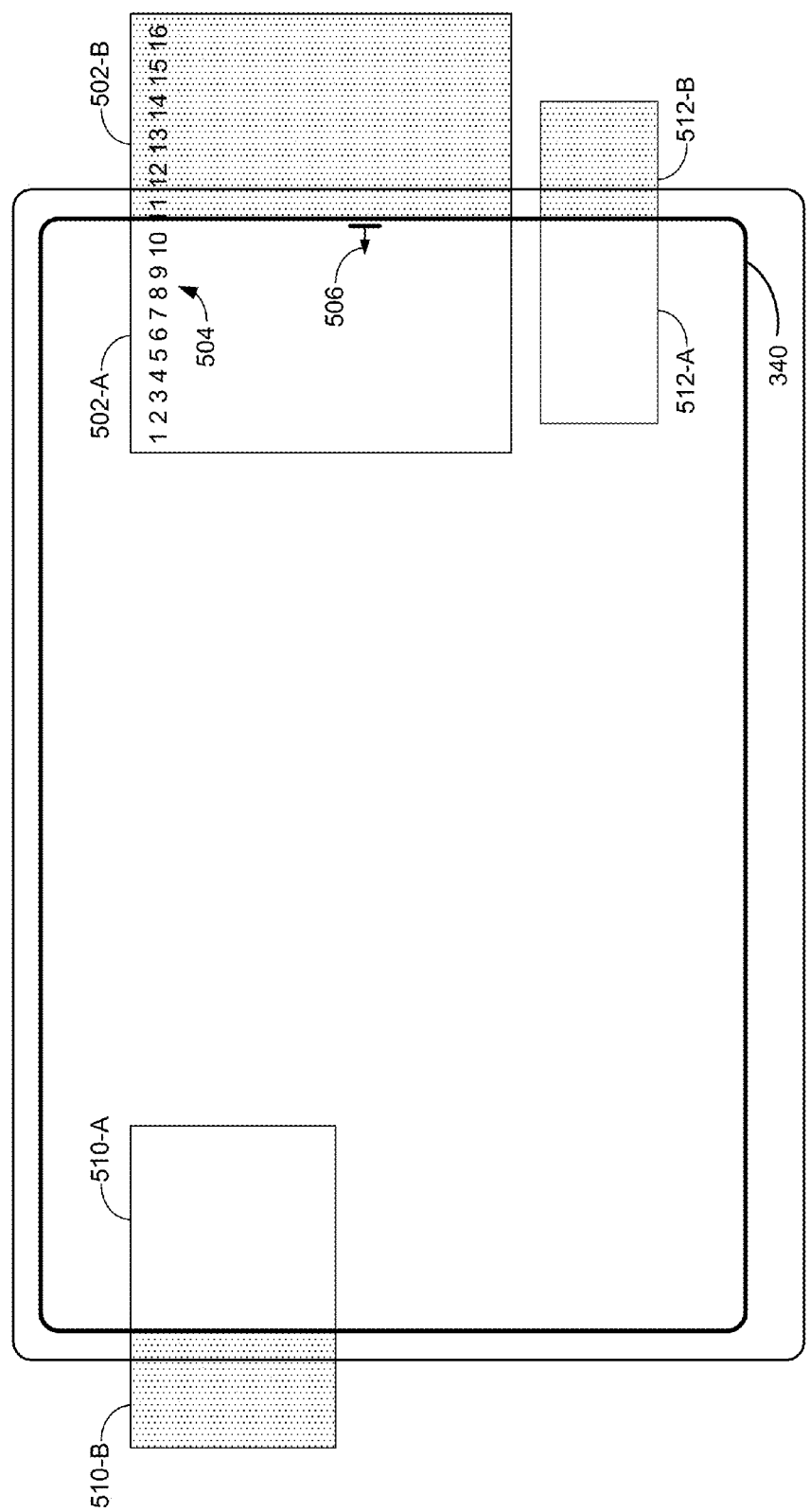

FIG. 5H also shows cursor 506 displayed on display 340. As is described above with reference to FIG. 5A, cursor 506 may be moved to a different location on display 340 in response to the detection of a cursor movement input. FIG. 5H shows cursor 506 moving 508, toward the right edge of display 340, to a location over window portion 502-A in response to the detection of a cursor movement input. FIG. 5I shows cursor 506, after movement 508, positioned at a location in proximity of the right edge of display 340 and over window portion 502-A. In response to detection of the cursor movement input that positions cursor 506 over portion 502-A and within a predefined distance from the edge of display 340 beyond which portion 502-B extends (FIG. 5I), the window adjustment mode is activated.

As described above with reference to FIG. 5C, in some embodiments, in response to detection of the cursor movement input that positions cursor 506 over portion 502-A and within a predefined distance from the edge of display 340 beyond which portion 502-B extends, cursor 506 is displayed with a different appearance to indicate activation of the window adjustment mode. For example, in FIG. 5J, the appearance of cursor 506 has changed from the pointer appearance as shown in FIG. 5I to the appearance shown in FIG. 5J.

While the window adjustment mode is active, a window adjustment input (not shown) is detected. In some embodiments, the window adjustment input corresponds to a predefined input. In some embodiments, the window adjustment input is a mouse button click or a gesture on a touch-sensitive surface. The gesture may be, for example, a swipe gesture or a tap gesture. In response to the detection of the window adjustment input, window 502, and optionally windows 510 and 512, are adjusted.

Figure 5K:
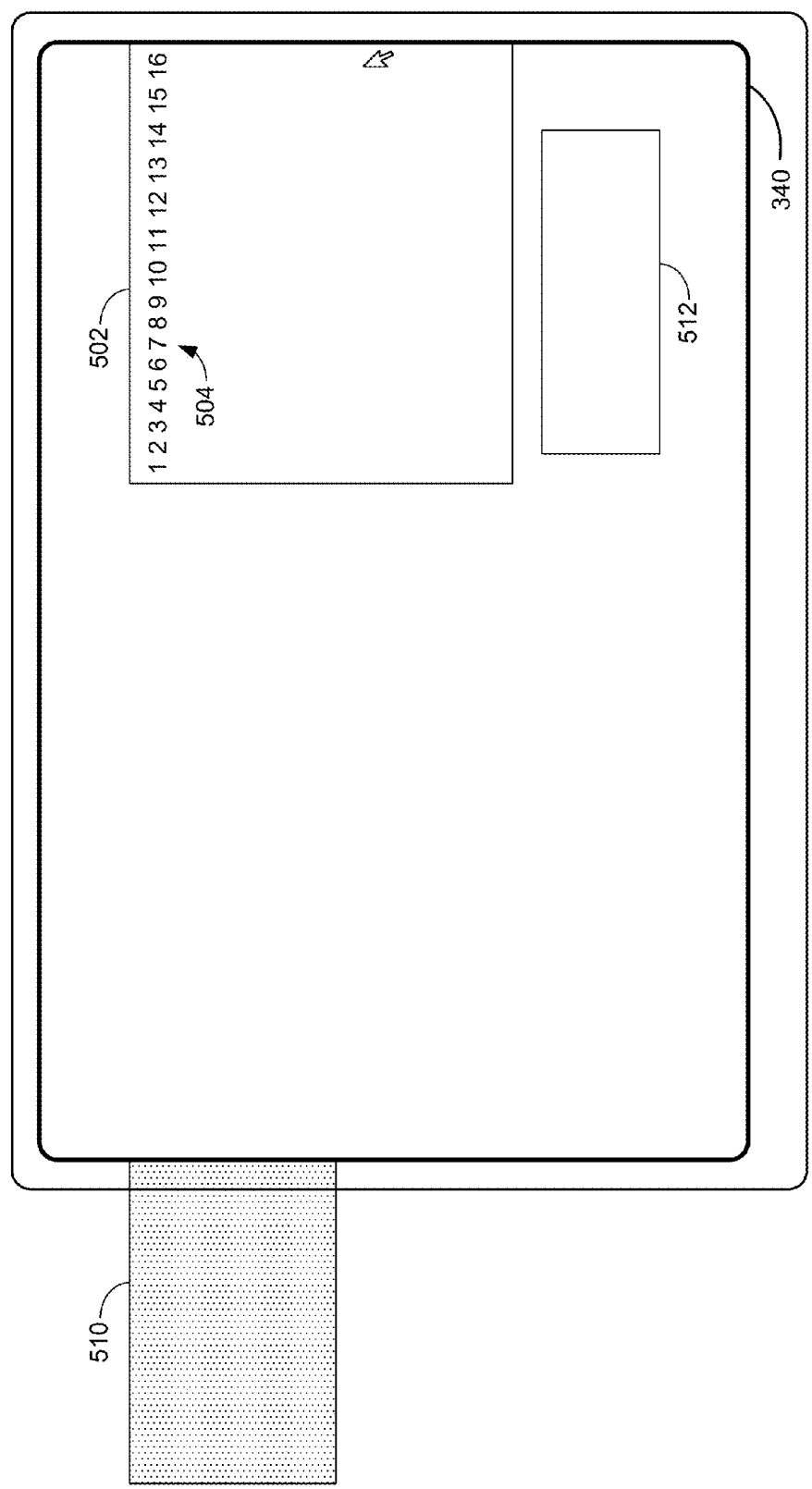

In some embodiments, the adjustment(s) include shifting windows so that window 502 (the window over which cursor 506 is positioned) is displayed entirely within the edges of display 340. In other words, windows that are displayed on display 340 and/or extend beyond the edges of display 340 are scrolled. For example, windows 502, 510, and 512 may be scrolled to the left, so that window 502 is displayed entirely within the edges of display 340 without resizing window 502 or adjusting content 504, as shown in FIG. 5K. Also as a result of scrolling the windows, window 510 is entirely hidden off-screen (indicated by the dotted background) and window 512 is displayed entirely within the edges of display 340, as shown in FIG. 5K.

Figure 5L:
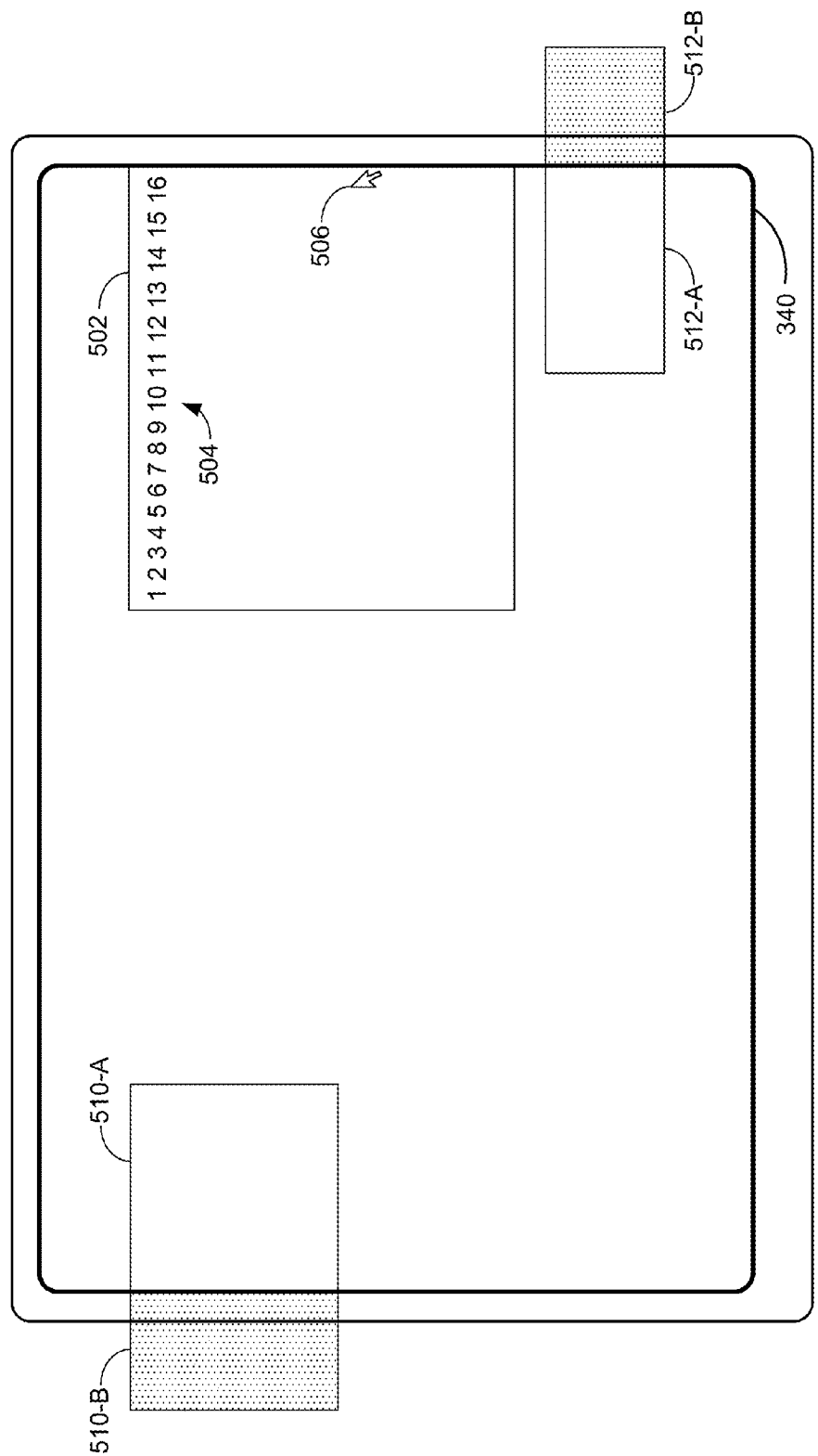

Alternatively, instead of shifting windows 502, 510, and 512, just window 502 is shifted. As shown in FIG. 5L, window 502 is shifted so that it is displayed entirely within the edges of display 340, while windows 510 and 512 remain at the same position as that shown in FIGS. 5H-5J.

Figure 5M:
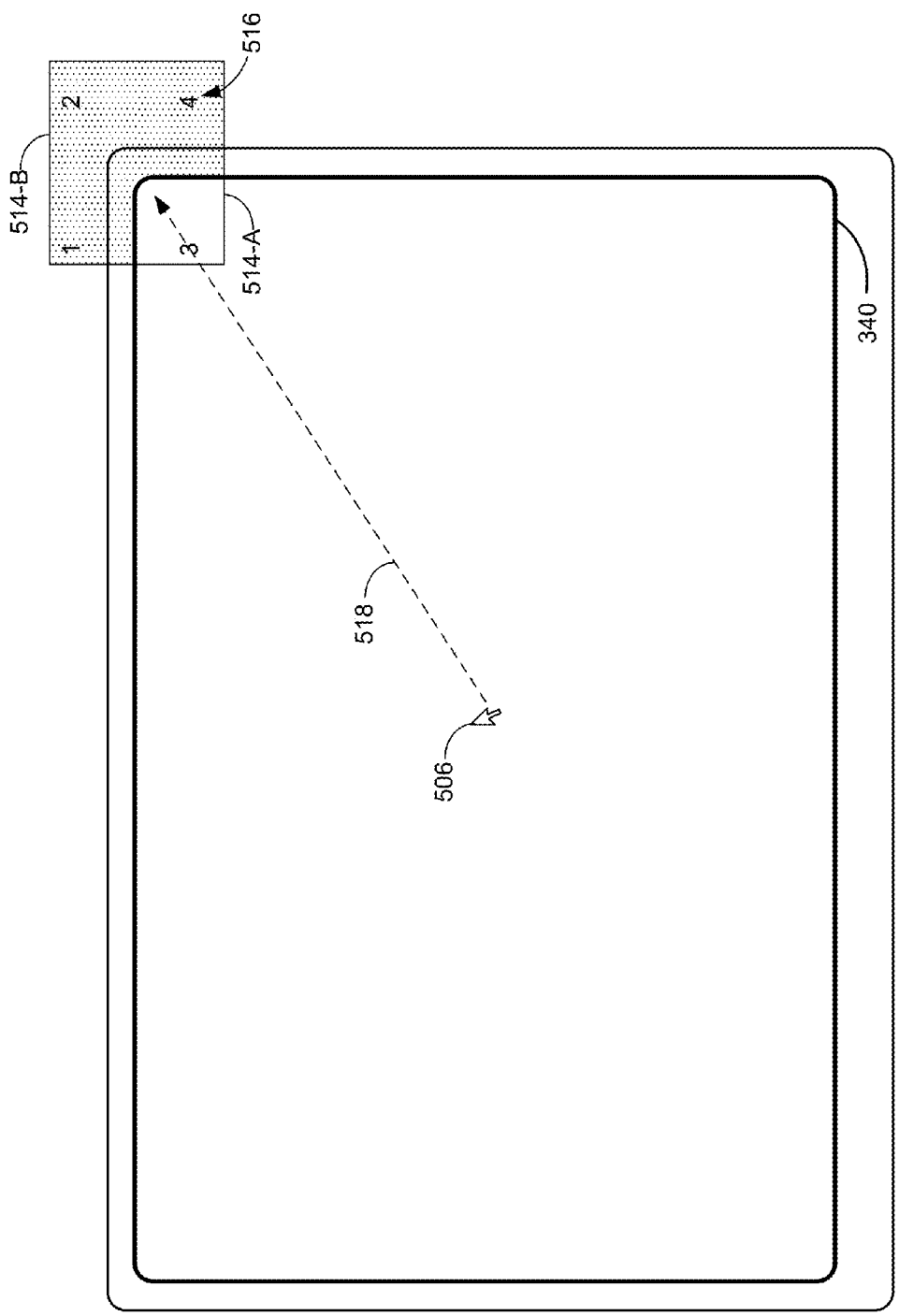

FIG. 5M illustrates window 514 of an application located at the upper right corner of display 340. Portion 514-A of window 514 is displayed on display 340. Portion 514-B (indicated by the dotted background) of window 514 extends beyond the edges of display 340 and is not displayed on display 340.

Window 514 includes content 516. For ease of illustration, in FIG. 5M, content 516 includes numbers 1-4 in text, one number located near each corner of window 514. In practice, content 516 would typically include more complex graphics.

Figure 5N:
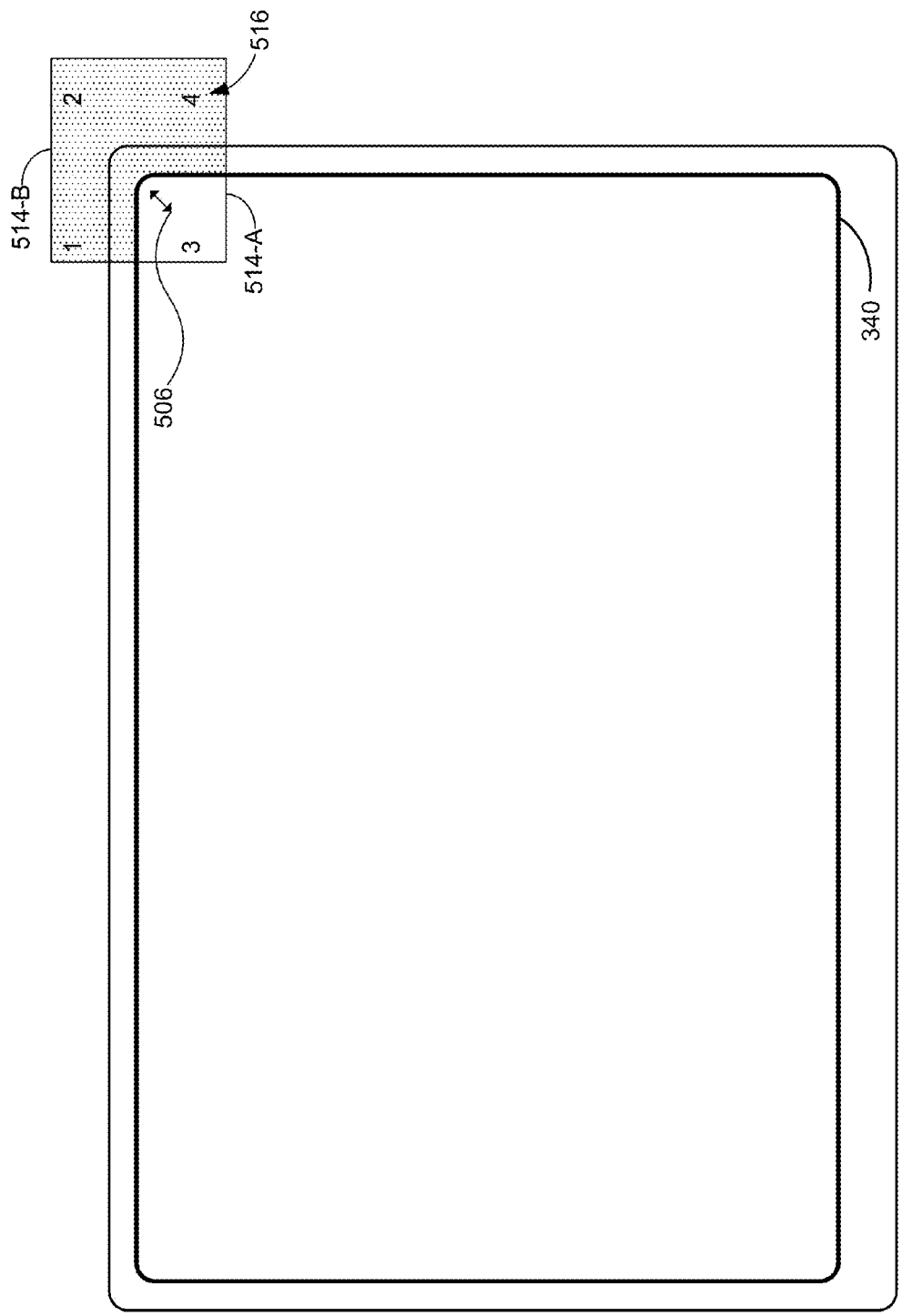

FIG. 5M also includes cursor 506 displayed on display 340. In response to the detection of a cursor movement input (not shown) moving cursor 506, cursor 506 moves 518 toward the upper right corner of display 340, to a position over window portion 514-A. FIG. 5N shows cursor 506 positioned at a position over portion 514-A and proximate to the upper and/or right edges of display 340.

In response to the detection of the cursor movement input that positions cursor 506 over portion 514-A and within a predefined distance from the edge(s) of display 340 beyond which portion 514-B extends, the window adjustment mode is activated. In some embodiments, in response to the detection of the cursor movement input that positions cursor 506 over portion 514-A and within a predefined distance from the edge(s) of display 340 beyond which portion 514-B extends, cursor 506 changes appearance (from the appearance of cursor 506 in FIG. 5M) to indicate activation of the window adjustment mode (as shown in FIG. 5N).

While the window adjustment mode is active, a window adjustment input (not shown) is detected. The window adjustment input corresponds to a predefined input. In some embodiments, the window adjustment input is a mouse button click or a gesture on a touch-sensitive surface. In response to the detection of the window adjustment input, window 514 is adjusted.

In some embodiments, the adjustment(s) to window 514 include resizing window 514 so that window 514 is displayed entirely within the edges of display 340. For example, in FIG. 5O, in response to the detection of the window adjustment input while the window adjustment mode is active, window 514 is resized to reduce its width from the right and to reduce its height from above, so that window 514 is displayed entirely within the edges of display 340. After the adjusting, numbers 1, 2, and 4 in content 516 extend beyond the edges of window 514 and are not displayed on display 340. To reveal numbers 1, 2, and 4 in window 514, the user would have to scroll content 516 in window 514.

Figure 5O:
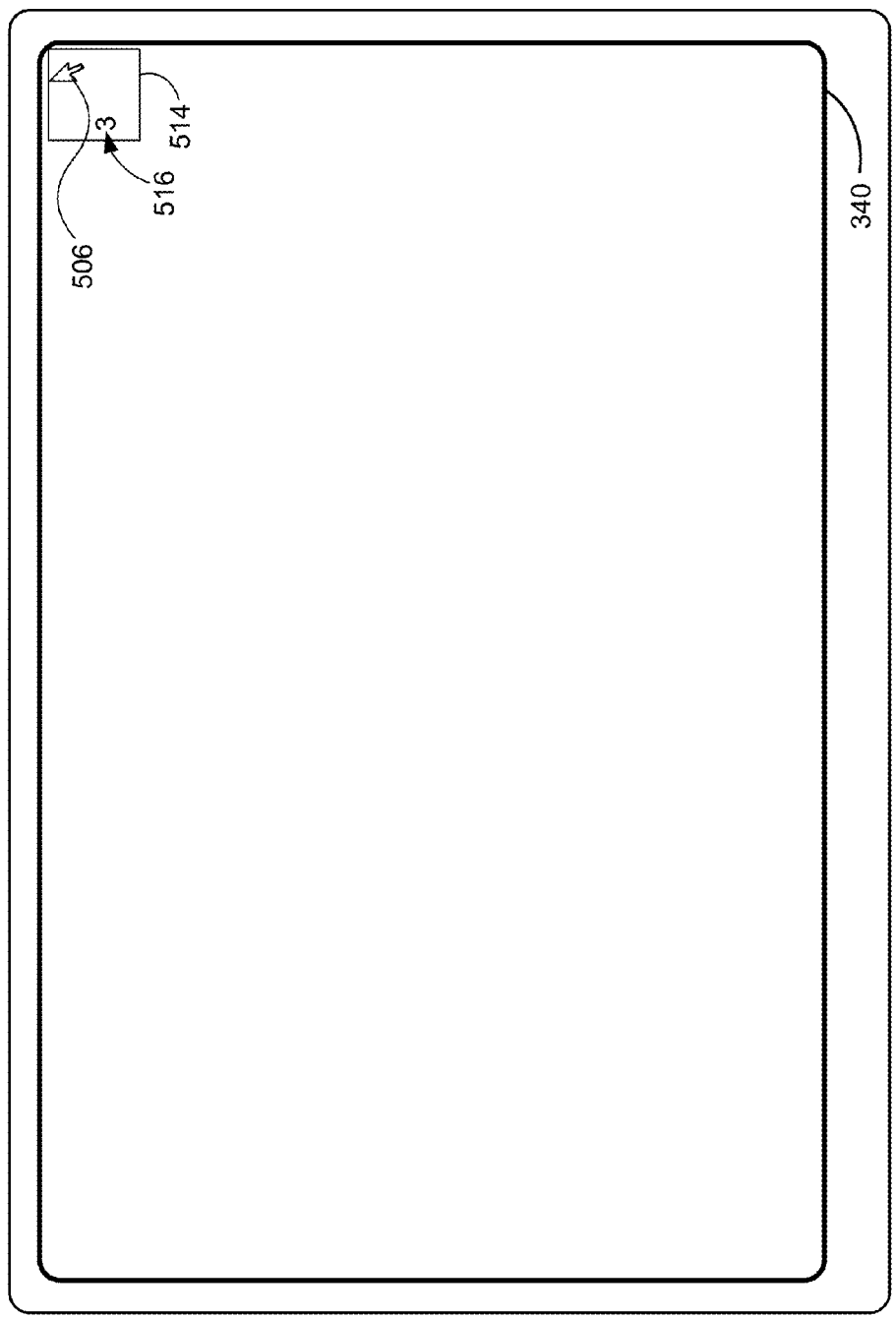
Figure 5P:
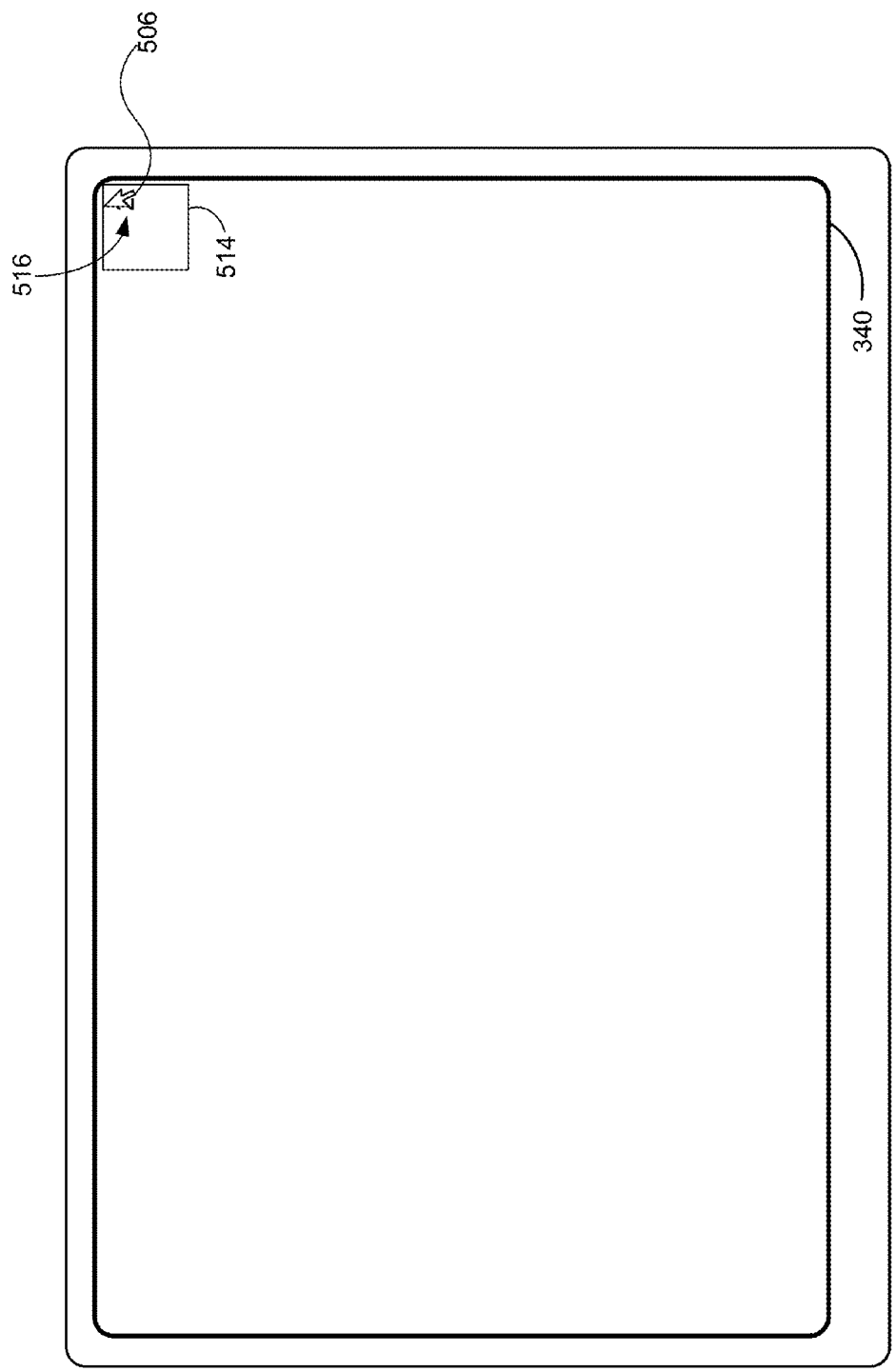

FIG. 5P shows an alternative adjustment to window 514 than that shown in FIG. 5O. In FIG. 5P, in response to the detection of the window adjustment input while the window adjustment mode is active, window 514 is resized to reduce its width from the left and reduce its height from below, and moved to a position within the edges of display 340, so that window 514 is entirely within the edges of display 340. Content 516 in window 514 may be adjusted. After the adjusting, numbers 1, 3, and 4 in content 516 extend beyond the edges of window 514 and are hidden, and number 2 is displayed in window 514, as shown in FIG. 5P. To reveal numbers 1, 3, and 4 in window 514, the user would have to scroll the contents of window 514.

Figure 5Q:
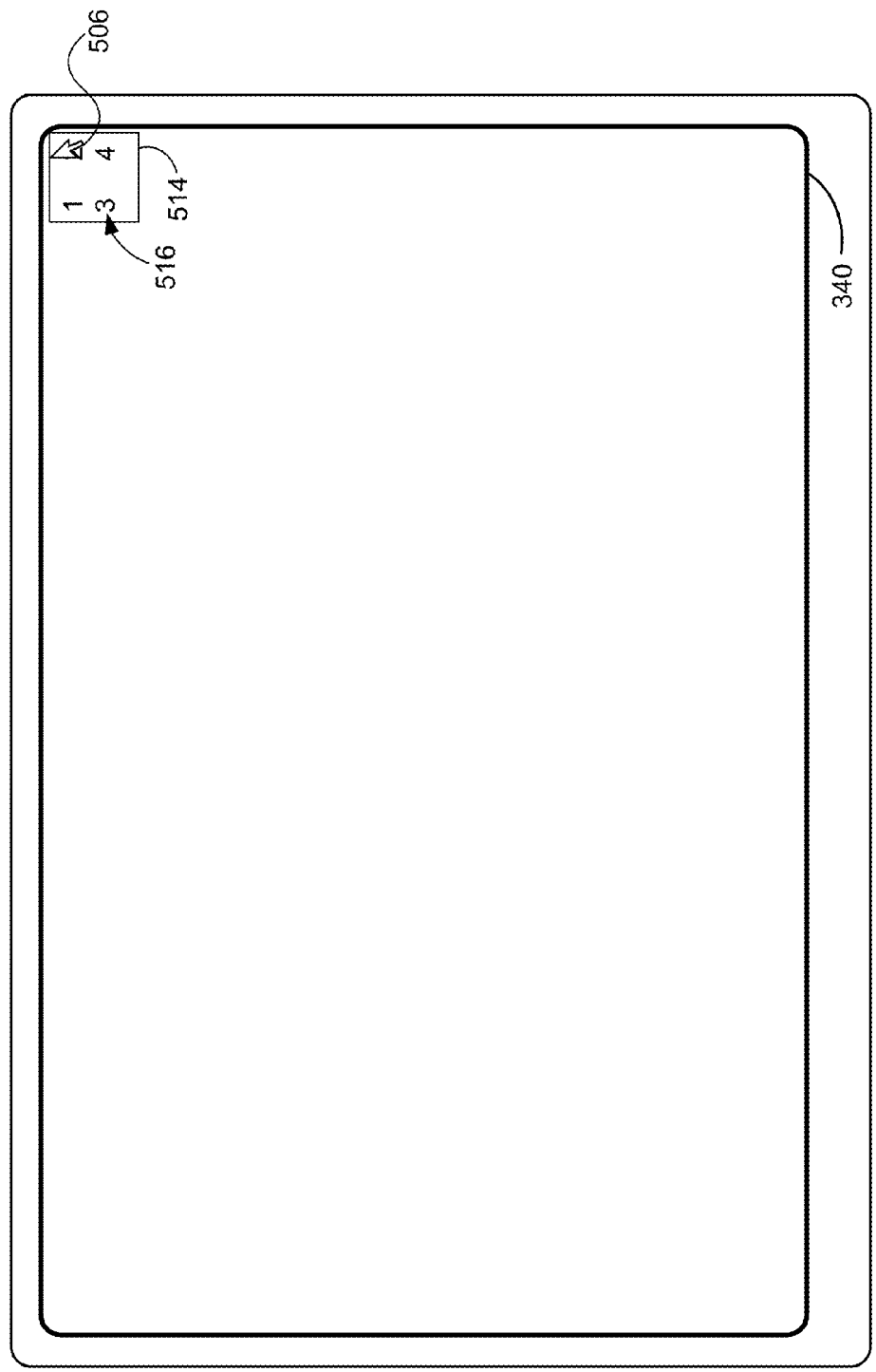
Figure 5R:
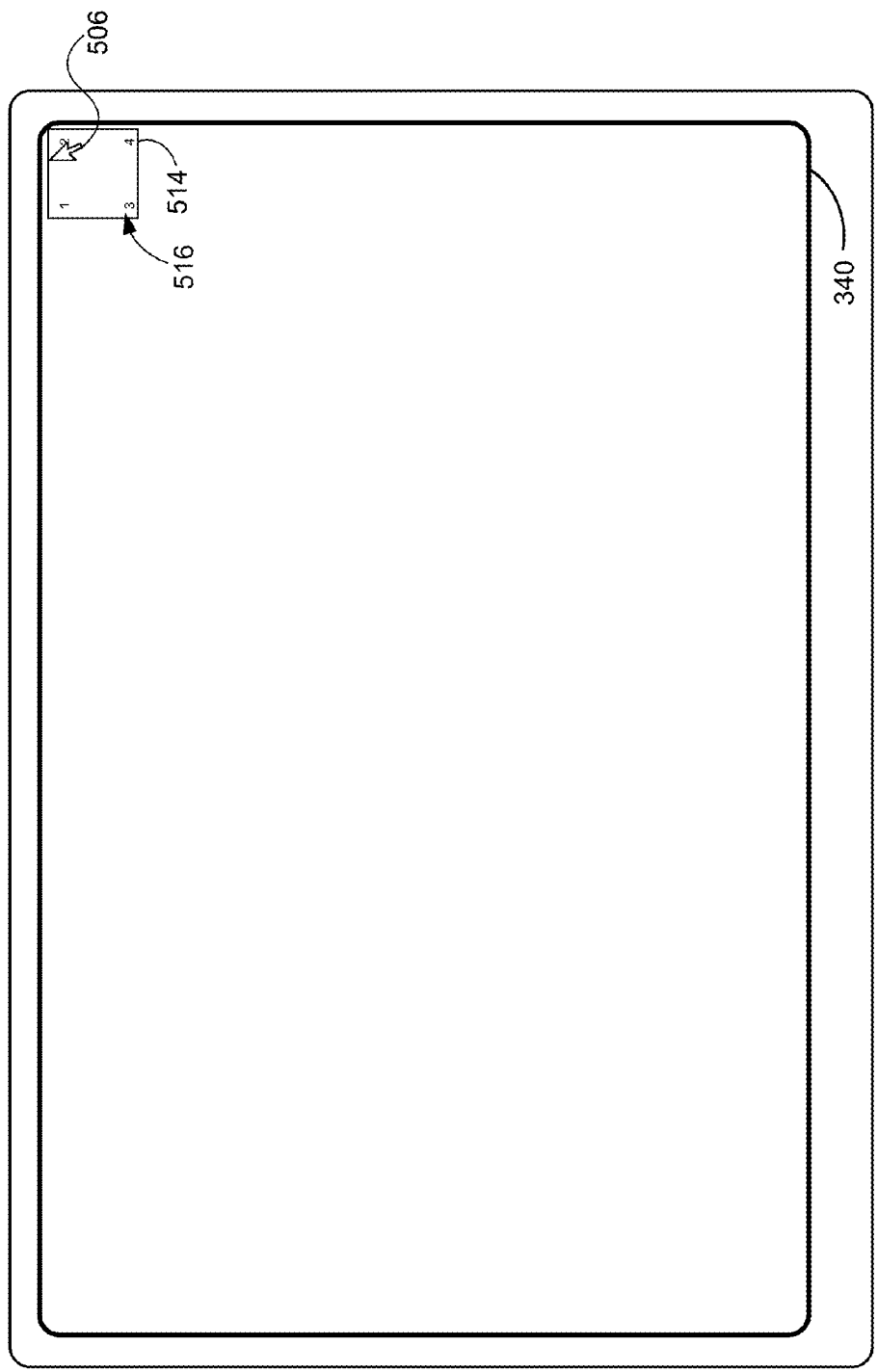

FIG. 5Q shows yet another alternative adjustment to window 514 than that shown in FIGS. 5O-5P. In FIG. 5Q, in response to the detection of the window adjustment input while the window adjustment mode is active, window 514 is resized, and content 516 is adjusted, so that window 514 is entirely within the edges of display 340, and content 516 (numbers 1-4) is displayed in window 514. In some embodiments, the adjustment of content 516 includes rescaling (e.g., zoom in or out) content 516, as shown in FIG. 5R.

FIG. 5S shows yet another alternative adjustment to window 514 than that shown in FIGS. 5O-5R. In FIG. 5S, in response to the detection of the window adjustment input while the window adjustment mode is active, window 514 is moved to a different position so that window 514 is entirely within the edges of display 340, but the size of window 514 remains the same and content 516 is not adjusted. The entirety of content 516 (numbers 1-4) is displayed on display 340, in window 514.

It may be the case that a window that extends off-screen also has a width and/or height that is larger than the corresponding dimension of display 340. For such a window, activating the window adjustment mode with the first input may bring the window entirely within the edges of display 340 by moving the window so that it "snaps" to a corner, with additional adjustments (e.g., resizing the window, reflowing content, or zooming) applied to the window and/or the contents within as needed, either automatically in response to activation of the window adjustment mode or manually in response to a subsequent window adjustment input by a user. For example, if window 514 in FIG. 5M has a width that is more than the width of display 340 and/or a height that is more than the height of display 340 (not shown in FIG. 5M, where window 514 has a width less than the width of display 340 and a height less than the height of display 340), activating the window adjustment mode with the first input may snap the upper right corner of window 514 to the upper right corner of display 340. Window 514 may be resized so that neither of its dimensions are larger than the corresponding dimension of display 340, either automatically in response to activation of the window adjustment mode or manually in response to a subsequent window adjustment input by a user.

FIGS. 6A-6B are flow diagrams illustrating a method 600 of adjusting partially off-screen windows in accordance with some embodiments. The method 600 is performed at an electronic device (e.g., device 300, FIG. 3, or portable multifunction device 100, FIG. 1) with a display bounded by a plurality of edges and optionally a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to adjust partially off-screen windows. The method reduces the cognitive burden on a user when manipulating partially off-screen windows, thereby creating a more efficient human-machine interface. For battery-operated electronic devices, enabling a user to adjust partially off-screen windows faster and more efficiently conserves power and increases the time between battery charges.

The device displays (602) a first portion of a first window on the display while not displaying a remaining portion of the first window on the display. The remaining portion of the first window extends in a virtual sense beyond at least one edge of the display. The displayed first portion of the first window has a first displayed size, and the first window has a total size that is a sum of the first displayed size and an undisplayed size of the remaining portion of the first window. As shown in FIG. 5A or 5H, for example, portion 502-A of window 502 is displayed on display 340. Portion 502-B extends beyond the right edge of display 340 and is not displayed on display 340. Window 502 has a size that is the sum of the sizes of portion 502-A and portion 502-B. As another example, in FIG. 5M, portion 514-A of window 514 is displayed on display 340. Portion 514-B extends beyond the corner edge(s) of display 340 and is not displayed on display 340.

The device detects (604) a first input that positions a cursor at a location on the display, the location being: over the displayed first portion of the first window, and within a predefined distance of an edge of the display. For example, device 300, in FIG. 5A or 5H, detects a cursor movement input (not shown) that moves cursor 506 to a location over portion 502-A and within a predefined number of pixels from the right edge of display 340 (as shown in FIG. 5B or 5I, respectively). As another example, in FIG. 5M, device 300 detects a cursor movement input (not shown) that moves cursor 506 to a location over portion 514-A and within a predefined number of pixels from the upper or right edge of display 340.

In response to detecting the first input that positions the cursor at the location on the display (606), the device activates (608) a window adjustment mode. For example, in FIG. 5B or 5I, in response to detection of the cursor movement input positioning cursor 506 at the location over portion 502-A and within a predefined distance from the right edge of display 340, a window adjustment mode is activated. As another example, in FIG. 5N, in response to detection of the cursor movement input positioning cursor 506 at the location over portion 514-A and within a predefined distance from the upper or right edge of display 340, a window adjustment mode is activated.

Note that the device activates the window adjustment mode in response to the cursor being positioned within a predefined distance from the edge of the display (e.g., 3, 5, 10, or any suitable number of pixels for the pixel density of the display) while the cursor is over the displayed first portion of the window, and not in response to the cursor being positioned within a predefined distance from the edge of the first window. Thus, in a situation where the cursor is located within a predefined distance from the edge of the display and, coincidentally, also near an edge of the first window, the activation of the window adjustment mode is responsive to being within the predefined distance from the edge of the display and not to being (coincidentally) near the edge of the first window.

In some embodiments, in response to detecting the first input (606), the device changes (610) the appearance of the cursor to indicate that the window adjustment mode is active. For example, in response to detection of the cursor movement input, positioning cursor 506 at the location over portion 502-A or 514-A and within a predefined distance from the edge(s) of display 340, the appearance of cursor 506 changes, as shown in FIGS. 5C, 5J, and 5N.

While the window adjustment mode is active, the device detects (612) a second input. For example, in FIGS. 5C, 5J, and 5N, while the window adjustment mode is active, a window adjustment input (not shown) is detected. The window adjustment input may be a mouse input (e.g., a mouse button click) or a gesture on a touch-sensitive surface, for example.

In some embodiments, the electronic device includes a touch-sensitive surface, and the second input is a gesture on the touch-sensitive surface (614). As shown in FIG. 3, device 300 may include touchpad 355. The window adjustment input may be a gesture on touchpad 355.

In some embodiments, the gesture on the touch-sensitive surface is a tap gesture (616). For example, the window adjustment input may be a tap gesture on touchpad 355.

In some embodiments, the gesture on the touch-sensitive surface is a swipe gesture (618). For example, the window adjustment input may be a swipe gesture on touchpad 355.

In response to detecting the second input, the device adjusts the first window in accordance with the second input (620). For example, FIGS. 5D-5G and 5K-5L, illustrate exemplary adjustments to window 502 in response to the detecting the window adjustment input. Similarly, FIGS. 5O-5S, illustrate exemplary adjustments to window 514 in response to detecting window adjustment input. The particular window adjustment input may be associated with a particular adjustment operation. For example, a tap gesture is associated with a resizing, and a swipe gesture is associated with a moving (e.g., scrolling) of the entire window onto the display. The adjustment that is applied to window 502 is in accordance with the operation associated with the particular window adjustment input that is detected.

In some embodiments, adjusting the first window includes resizing the first window to display the first window entirely within the edges of the display (622). For example, window 502 may be resized to be entirely within display 340 (as in FIG. 5D). As another example, window 514 may be resized to be entirely within display 340 (as in FIG. 5O).

In some embodiments, resizing the window changes the total size of the first window to the first displayed size (624). For example, in FIG. 5D, window 502 is resized to the size of portion 502-A.

In some embodiments, adjusting the first window includes repositioning the first window to display the first window entirely within the edges of the display while maintaining the total size of the first window (626). For example, in FIGS. 5F, 5K, and 5L, window 502 is repositioned to be entirely within the edges of display 340.

In some embodiments, adjusting the first window includes reflowing content in the first window to display the content in the window entirely within the edges of the display (628).

In some embodiments, other graphical objects are displayed concurrently on the display with the first window, and adjusting the first window includes scrolling the other graphical objects and the first window to display the first window entirely within the edges of the display (630). For example, in FIG. 5J, portions 510-A of window 510 and 512-A of window 512 are displayed on display 340 along with window portion 502-A. In response to the window adjustment input, window 502, 510, and 512 are scrolled so that window 502 is entirely within the edges of display 340, as in FIG. 5K.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein.

Figure 7:
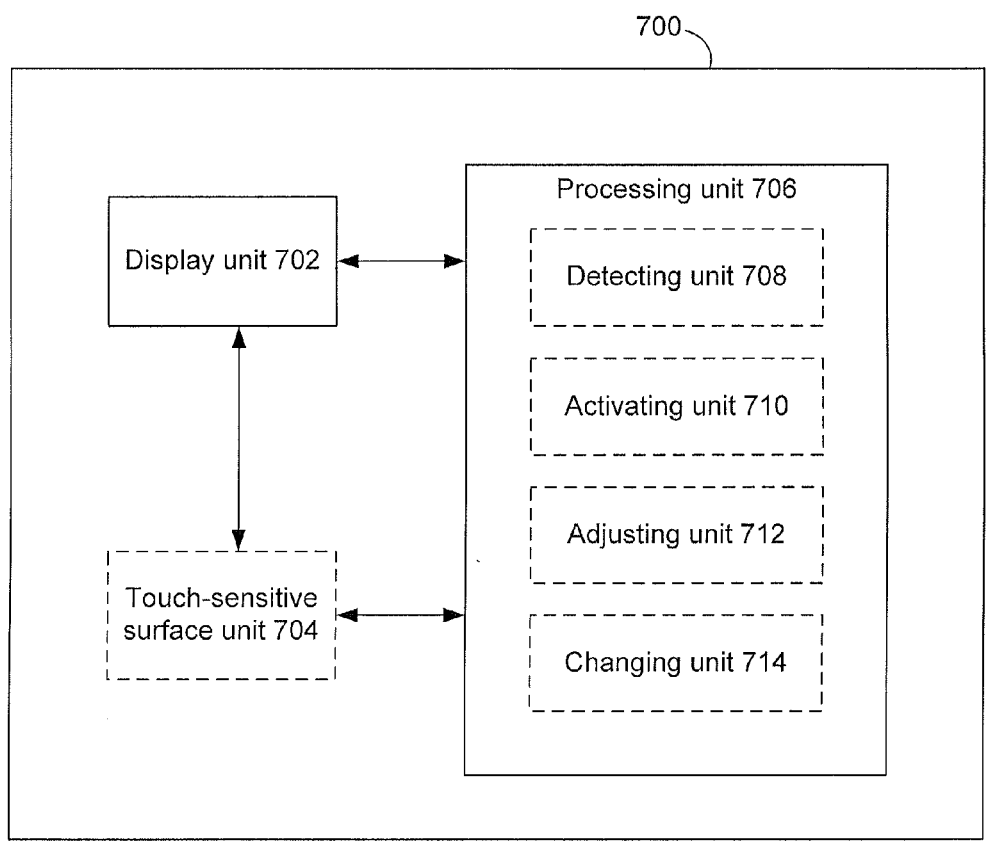
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702. The display unit 702 is bounded by a plurality of edges. The display unit 702 is configured to display a first portion of a first window on the display unit 702 while not displaying a remaining portion of the first window on the display unit 702, where: the remaining portion of the first window extends in a virtual sense beyond at least one edge of the display unit 702, the displayed first portion of the first window has a first displayed size, and the first window has a total size that is a sum of the first displayed size and an undisplayed size of the remaining portion of the first window. Electronic device 700 also includes a processing unit 706 coupled to the display unit 702. In some embodiments, the processing unit 706 includes a detecting unit 708, an activating unit 710, an adjusting unit 712, and a changing unit 714.

The processing unit 706 is configured to: detect a first input that positions a cursor at a location on the display unit 702 (e.g., with the detecting unit 708), the location being: over the displayed first portion of the first window, and within a predefined distance of an edge of the display unit 702; in response to detecting the first input that positions the cursor at the location on the display unit 702, activate a window adjustment mode (e.g., with the activating unit 710); while the window adjustment mode is active, detecting a second input (e.g., with the detecting unit 708); and, in response to detecting the second input, adjust the first window in accordance with the second input (e.g., with the adjusting unit 712).

In some embodiments, adjusting the first window includes resizing the first window to display the first window entirely within the edges of the display unit 702.

In some embodiments, resizing the window changes the total size of the first window to the first displayed size.

In some embodiments, adjusting the first window includes repositioning the first window to display the first window entirely within the edges of the display unit 702 while maintaining the total size of the first window.

In some embodiments, adjusting the first window includes reflowing content in the first window to display the content in the window entirely within the edges of the display unit 702.

In some embodiments, other graphical objects are displayed concurrently on the display unit 702 with the first window, and adjusting the first window includes scrolling the other graphical objects and the first window to display the first window entirely within the edges of the display unit 702.

In some embodiments, the processing unit 706 is configured to: in response to detecting the first input, change the appearance of the cursor to indicate that the window adjustment mode is active (e.g., with the changing unit 714).

In some embodiments, the electronic device 700 includes a touch-sensitive surface unit 704 configured to receive gestures, and the second input is a gesture on the touch-sensitive surface unit 704.

In some embodiments, the gesture on the touch-sensitive surface unit 704 is a tap gesture.

In some embodiments, the gesture on the touch-sensitive surface unit 704 is a swipe gesture.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 3, 7) are all included within the scope of protection of the invention.

The operations described above with reference to FIGS. 6A-6B may be implemented by components depicted in FIGS. 1A-1B. For example, detection operation 606 or 612, window adjustment mode activation operation 608, and adjusting operation 620 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
 a hardware display, the hardware display bounded by a plurality of physical edges;
 one or more processors;
 memory; and
 one or more programs, wherein the one or more programs are stored in the memory and configured to be executed by the one or more processors, the one or more programs including instructions for:
 displaying a first portion of a first window on the hardware display while not displaying a remaining portion of the first window on the hardware display, the displayed first portion of the first window extending to at least one edge of the hardware display, wherein:
  the remaining portion of the first window extends in a virtual sense beyond at least one edge of the hardware display;
  the displayed first portion of the first window has a first displayed size; and
  the first window has a total size that is a sum of the first displayed size and an undisplayed size of the remaining portion of the first window;
 detecting a first input that positions a cursor, without moving the first window, at a location on the hardware display, the location being:
  over the first portion of the first window that is displayed on the hardware display; and
  within a region that extends from an edge of the hardware display to a predefined number of pixels away from the edge of the hardware display;
 in response to a determination that the location of the cursor is over the first portion of the first window that is displayed on the hardware display and is within the region, activating a window adjustment mode;
 while the window adjustment mode is active, detecting a second input; and, in response to detecting the second input, adjusting the first window in accordance with the second input, wherein adjusting the first window includes resizing the first window to display the first window entirely within the edges of the hardware display.

2. The device of claim 1, wherein resizing the first window changes the total size of the first window to the first displayed size.

3. The device of claim 1, wherein adjusting the first window includes reflowing content in the first window to display the content in the first window entirely within the edges of the hardware display.

4. The device of claim 1, including instructions for: in response to detecting the first input, changing the appearance of the cursor to indicate that the window adjustment mode is active.

5. A method, comprising:
at an electronic device with a hardware display, the hardware display bounded by a plurality of physical edges:
displaying a first portion of a first window on the hardware display while not displaying a remaining portion of the first window on the hardware display, the displayed first portion of the first window extending to at least one edge of the hardware display, wherein:
the remaining portion of the first window extends in a virtual sense beyond at least one edge of the hardware display;
the displayed first portion of the first window has a first displayed size; and
the first window has a total size that is a sum of the first displayed size and an undisplayed size of the remaining portion of the first window;
detecting a first input that positions a cursor, without moving the first window, at a location on the hardware display, the location being:
over the first portion of the first window that is displayed on the hardware display; and
within a region that extends from an edge of the hardware display to a predefined number of pixels away from the edge of the hardware display;
in response to a determination that the location of the cursor is over the first portion of the first window that is displayed on the hardware display and is within the region, activating a window adjustment mode;
while the window adjustment mode is active, detecting a second input; and,
in response to detecting the second input, adjusting the first window in accordance with the second input, wherein adjusting the first window includes resizing the first window to display the first window entirely within the edges of the hardware display.

6. The method of claim 5, wherein resizing the first window changes the total size of the first window to the first displayed size.

7. The method of claim 5, wherein adjusting the first window includes reflowing content in the first window to display the content in the first window entirely within the edges of the hardware display.

8. The method of claim 5, including: in response to detecting the first input, changing the appearance of the cursor to indicate that the window adjustment mode is active.

9. A non-transitory computer readable storage medium storing one or more programs, the one or more programs comprising instructions, which when executed by an electronic device with a hardware display, the hardware display bounded by a plurality of physical edges, cause the device to:
display a first portion of a first window on the hardware display while not displaying a remaining portion of the first window on the hardware display, the displayed first portion of the first window extending to at least one edge of the hardware display, wherein:
the remaining portion of the first window extends in a virtual sense beyond at least one edge of the hardware display;
the displayed first portion of the first window has a first displayed size; and
the first window has a total size that is a sum of the first displayed size and an undisplayed size of the remaining portion of the first window;
detect a first input that positions a cursor, without moving the first window, at a location on the hardware display, the location being:
over the first portion of the first window that is displayed on the hardware display; and
within a region that extends from an edge of the hardware display to a predefined number of pixels away from the edge of the hardware display;
in response to a determination that the location of the cursor is over the first portion of the first window that is displayed on the hardware display and is within the region, activate a window adjustment mode;
while the window adjustment mode is active, detect a second input; and,
in response to detecting the second input, adjust the first window in accordance with the second input, wherein adjusting the first window includes resizing the first window to display the first window entirely within the edges of the hardware display.

10. The non-transitory computer readable storage medium of claim 9, wherein resizing the first window changes the total size of the first window to the first displayed size.

11. The non-transitory computer readable storage medium of claim 9, wherein adjusting the first window includes reflowing content in the first window to display the content in the first window entirely within the edges of the hardware display.

12. The non-transitory computer readable storage medium of claim 9, including: in response to detecting the first input, changing the appearance of the cursor to indicate that the window adjustment mode is active.

* * * * *